United States Patent
Matsueda et al.

(10) Patent No.: US 10,071,787 B2
(45) Date of Patent: Sep. 11, 2018

(54) BICYCLE HYDRAULIC DEVICE

(71) Applicant: SHIMANO INC., Sakai (JP)

(72) Inventors: Keiji Matsueda, Sakai (JP); Kentaro Kosaka, Sakai (JP); Takashi Ito, Sakai (JP)

(73) Assignee: SHIMANO INC., Sakai (JP)

( * ) Notice: Subject to any disclaimer, the term of this patent is extended or adjusted under 35 U.S.C. 154(b) by 21 days.

(21) Appl. No.: 15/210,827

(22) Filed: Jul. 14, 2016

(65) Prior Publication Data

US 2018/0015982 A1 Jan. 18, 2018

(51) Int. Cl.
*B62L 3/02* (2006.01)
*B62K 23/06* (2006.01)

(52) U.S. Cl.
CPC ............. *B62L 3/023* (2013.01); *B62K 23/06* (2013.01)

(58) Field of Classification Search
CPC ............ B62L 3/02; B62L 3/023; B62K 23/06
See application file for complete search history.

(56) References Cited

U.S. PATENT DOCUMENTS

| | | | | |
|---|---|---|---|---|
| 2006/0071542 A1* | 4/2006 | Lichtensteiger | .......... | B60T 7/10 303/89 |
| 2010/0052415 A1* | 3/2010 | Vezzoli | ................... | B60T 11/22 303/10 |
| 2012/0085090 A1* | 4/2012 | Gohr | ....................... | B60T 11/16 60/533 |
| 2014/0231202 A1* | 8/2014 | Shih | ....................... | B62L 3/023 188/344 |
| 2015/0090550 A1* | 4/2015 | Matsueda | ............... | B62L 3/023 188/344 |
| 2016/0264213 A1* | 9/2016 | Swanson | ................. | B62L 3/023 |
| 2017/0073035 A1* | 3/2017 | Dunlap, III | ............... | B62L 1/16 |

* cited by examiner

*Primary Examiner* — Pamela Rodriguez
(74) *Attorney, Agent, or Firm* — Mori & Ward, LLP

(57) ABSTRACT

A bicycle hydraulic device comprises a base member and a cover member. The base member is configured to be mounted to a bicycle body. The base member comprises a hydraulic bore and an insertion portion. The hydraulic bore has a first end and a second end. The first end defines a first opening. The insertion portion is provided between the first end and the second end. The insertion portion includes an insertion opening different from the first opening. The cover member is provided at the insertion portion via the insertion opening to cover the hydraulic bore.

20 Claims, 24 Drawing Sheets

BICYCLE HYDRAULIC DEVICE

BACKGROUND OF THE INVENTION

Field of the Invention

The present invention relates to a bicycle hydraulic device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hydraulic device.

SUMMARY OF THE INVENTION

In accordance with a first aspect of the present invention, a bicycle hydraulic device comprises a base member and a cover member. The base member is configured to be mounted to a bicycle body. The base member comprises a hydraulic bore and an insertion portion. The hydraulic bore has a first end and a second end. The first end defines a first opening. The insertion portion is provided between the first end and the second end. The insertion portion includes an insertion opening different from the first opening. The cover member is provided at the insertion portion via the insertion opening to cover the hydraulic bore.

With the bicycle hydraulic device according to the first aspect, it is possible to cover the hydraulic bore with a simple structure such as the cover member. Thus, it is possible to simplify the structure of the bicycle hydraulic device.

In accordance with another aspect of the present invention, a bicycle hydraulic device comprises a base member, a piston, a cover member, and a seal member. The base member is configured to be mounted to a bicycle body. The base member includes a hydraulic bore. The hydraulic bore has a first end and a second end. The first end defines a first opening. The second end defines a second opening. The piston is movably provided in the hydraulic bore to be removable from the second opening. The cover member is provided on the base member to define a hydraulic chamber between the cover member and the piston in the hydraulic bore. The seal member is provided in the hydraulic bore between the cover member and the piston. The seal member is attachably and detachably coupled to the cover member.

With the bicycle hydraulic device according to the above aspect, it is possible to simplify the structure of the bicycle hydraulic device by using the cover member and the seal member.

In accordance with a second aspect of the present invention, the bicycle hydraulic device according to any one of the above aspects is configured so that the insertion portion is provided closer to the first end than the second end.

With the bicycle hydraulic device according to the second aspect, it is possible to effectively utilize a space provided between the insertion portion and the second end in the hydraulic bore.

In accordance with a third aspect of the present invention, the bicycle hydraulic device according to any one of the above aspects is configured so that the second end defines a second opening. The insertion opening is different from the second opening.

With the bicycle hydraulic device according to the third aspect, it is possible to attach the cover member to the insertion portion in a state where the piston is provided in the hydraulic bore. Thus, it is possible to increase an assembly procedure of the bicycle hydraulic device and/or to select a suitable assembly procedure of the bicycle hydraulic device.

In accordance with a fourth aspect of the present invention, the bicycle hydraulic device according to any one of the above aspects further comprises a piston movably provided in the hydraulic bore to be removable from the second opening.

With the bicycle hydraulic device according to the fourth aspect, it is possible to insert the piston from the second opening to assemble the bicycle hydraulic device. Thus, it is possible to improve freedom of design of the insertion portion and the cover member.

In accordance with a fifth aspect of the present invention, the bicycle hydraulic device according to any one of the above aspects is configured so that the insertion portion includes a first surface extending along a plane facing the second end. The cover member is contactable with the first surface.

With the bicycle hydraulic device according to the fifth aspect, it is possible to receive a hydraulic pressure applied to the cover member with the first surface of the insertion portion. Thus, it is possible to further simplify the structure of the bicycle hydraulic device.

In accordance with a sixth aspect of the present invention, the bicycle hydraulic device according to any one of the above aspects is configured so that the hydraulic bore defines a center axis. The plane including the first surface is perpendicular to the center axis.

With the bicycle hydraulic device according to the sixth aspect, it is possible to effectively receive the hydraulic pressure applied to the cover member with the first surface of the insertion portion.

In accordance with a seventh aspect of the present invention, the bicycle hydraulic device according to any one of the above aspects is configured so that the insertion portion includes a second surface spaced apart from the first surface to face toward the first surface.

With the bicycle hydraulic device according to the seventh aspect, it is possible to define a space to arrange the cover member between the first surface and the second surface.

In accordance with an eighth aspect of the present invention, the bicycle hydraulic device according to any one of the above aspects is configured so that the hydraulic bore extends in an axial direction along a center axis. The second surface faces toward the first surface without being offset from the first surface when viewed from the axial direction.

With the bicycle hydraulic device according to the eighth aspect, it is possible to compact the insertion portion.

In accordance with a ninth aspect of the present invention, the bicycle hydraulic device according to any one of the above aspects is configured so that the second surface has a protrusion extending toward the first surface.

With the bicycle hydraulic device according to the ninth aspect, it is possible to hold the cover member between the first surface and the second surface by using the protrusion.

In accordance with a tenth aspect of the present invention, the bicycle hydraulic device according to any one of the above aspects is configured so that the cover member is at least partly provided between the first surface and the second surface.

With the bicycle hydraulic device according to the tenth aspect, it is possible to hold the cover member between the first surface and the second surface.

In accordance with an eleventh aspect of the present invention, the bicycle hydraulic device according to any one of the above aspects is configured so that the hydraulic bore defines a center axis. The first surface extends about the center axis. The second surface extends about the center axis.

With the bicycle hydraulic device according to the eleventh aspect, it is possible to compact the insertion portion with providing a space to arrange the cover member.

In accordance with a twelfth aspect of the present invention, the bicycle hydraulic device according to any one of the above aspects is configured so that the insertion portion includes a third surface connecting the second surface to the first surface. The first surface, the second surface, and the third surface define an insertion groove having the insertion opening.

With the bicycle hydraulic device according to the twelfth aspect, it is possible to certainly hold the cover member in the insertion groove.

In accordance with a thirteenth aspect of the present invention, the bicycle hydraulic device according to any one of the above aspects further comprises a seal member provided in the hydraulic bore between the cover member and the second end.

With the bicycle hydraulic device according to the thirteenth aspect, the seal member can improve a sealing performance between the hydraulic bore and the cover member.

In accordance with a fourteenth aspect of the present invention, the bicycle hydraulic device according to any one of the above aspects is configured so that the seal member includes a main body and a seal. The main body is coupled to the cover member. The seal is provided on the main body so as to be in contact with an inner peripheral surface of the hydraulic bore.

With the bicycle hydraulic device according to the fourteenth aspect, the cover member and the main body can stabilize a position of the seal relative to the hydraulic bore. This can effectively improve the sealing performance between the hydraulic bore and the cover member.

In accordance with a fifteenth aspect of the present invention, the bicycle hydraulic device according to any one of the above aspects is configured so that the seal member includes a restricting part engaged with the cover member to restrict a relative movement between the main body and the cover member.

With the bicycle hydraulic device according to the fifteenth aspect, the restricting part can stabilize an orientation of the main body relative to the cover member. This can further effectively improve the sealing performance between the hydraulic bore and the cover member.

In accordance with a sixteenth aspect of the present invention, the bicycle hydraulic device according to any one of the above aspects is configured so that the cover member includes an engagement opening. The restricting part is provided in the engagement opening.

With the bicycle hydraulic device according to the sixteenth aspect, it is possible to stabilize the orientation of the main body relative to the cover member with a simple structure such as the engagement opening and the restricting part.

In accordance with a seventeenth aspect of the present invention, the bicycle hydraulic device according to any one of the above aspects further comprises a coupling member coupling the main body to the cover member.

With the bicycle hydraulic device according to the seventeenth aspect, the coupling member can stabilize an orientation of the main body relative to the cover member. This can further effectively improve the sealing performance between the hydraulic bore and the cover member.

In accordance with an eighteenth aspect of the present invention, the bicycle hydraulic device according to any one of the above aspects further comprises a stopper attached to the base member to restrict a relative movement between the cover member and the base member.

With the bicycle hydraulic device according to the eighteenth aspect, it is possible to restrict the cover member from being unintentionally removed from the insertion portion.

In accordance with a nineteenth aspect of the present invention, the bicycle hydraulic device according to any one of the above aspects is configured so that the base member includes a fluid passageway connected to the hydraulic bore. An end of the fluid passageway is closed by the stopper.

With the bicycle hydraulic device according to the nineteenth aspect, it is possible to utilize the stopper as a closure of the end of the fluid passageway. This can simplify the structure of the bicycle hydraulic device with restricting the cover member from being unintentionally removed from the insertion portion.

In accordance with a twentieth aspect of the present invention, a bicycle hydraulic device comprises a base member, a piston, a cover member, and a seal member. The base member is configured to be mounted to a bicycle body. The base member includes a hydraulic bore. The hydraulic bore has a first end and a second end. The first end defines a first opening. The second end defines a second opening. The piston is movably provided in the hydraulic bore to be removable from the second opening. The cover member is provided on the base member to define a hydraulic chamber between the cover member and the piston in the hydraulic bore. The seal member is provided in the hydraulic bore between the cover member and the piston. The seal member is attachably and detachably coupled to the cover member.

With the bicycle hydraulic device according to the twentieth aspect, it is possible to simplify the structure of the bicycle hydraulic device by using the cover member and the seal member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
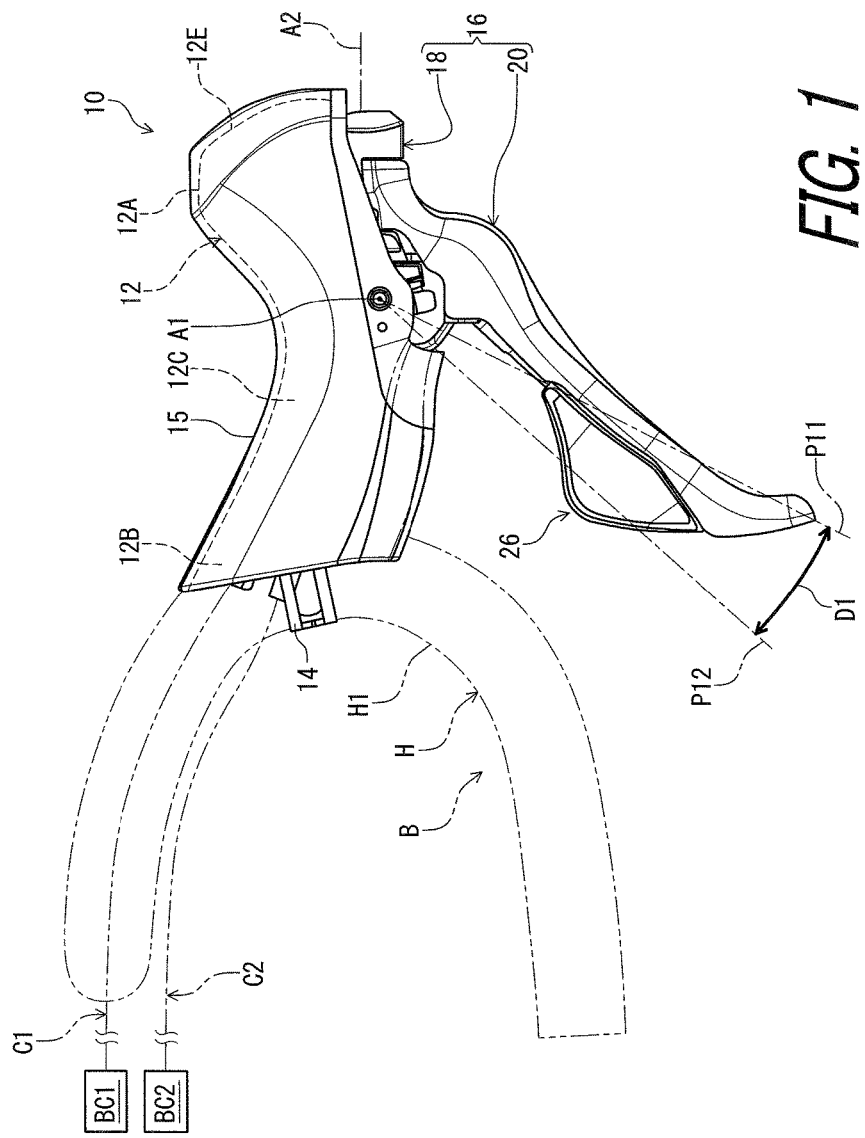
FIG. 1 is a right side elevational view of a bicycle hydraulic device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle hydraulic device 10 in accordance with a first embodiment is configured to be mounted to a bicycle body B. For example, the bicycle body B includes a handlebar H, a bicycle frame (not shown), a stem (not shown), and a seatpost (not shown). In this embodiment, the bicycle hydraulic device 10 is configured to be mounted to the handlebar H. Specifically, the bicycle hydraulic device 10 is configured to be mounted to a drop-down handlebar. However, the bicycle hydraulic device 10 can be mounted to other type of handlebars such as a flat handlebar, a time trial handlebar, and a bull horn handlebar. The handlebar H can also be referred to as the drop-down handlebar H. Furthermore, the bicycle hydraulic device 10 can be mounted to parts other than the handlebar H in the bicycle body B. Since structures of the bicycle body B have been known in the bicycle field, they will not be described in detail here for the sake of brevity.

The bicycle hydraulic device 10 is operatively coupled to a hydraulic bicycle component BC1 such as a hydraulic bicycle brake. In this embodiment, the bicycle hydraulic device 10 is operatively coupled to the hydraulic bicycle component BC1 via a hydraulic hose C1.

Furthermore, the bicycle hydraulic device 10 is operatively coupled to an additional bicycle component BC2. In this embodiment, the bicycle hydraulic device 10 is operatively coupled to the additional bicycle component BC2 via a mechanical control cable C2. Examples of the additional bicycle component BC2 include a shifting device, an adjustable seatpost assembly, and a bicycle suspension. Examples of the mechanical control cable C2 include a Bowden cable. In this embodiment, the additional bicycle component BC2 includes the shifting device to change a speed stage of a bicycle. The additional bicycle component BC2 can also be referred to as the shifting device BC2.

In this embodiment, the bicycle hydraulic device 10 is a right hand side control device configured to be operated by the rider's right hand to actuate the hydraulic bicycle component BC1 and the additional bicycle component BC2. However, the structures of the bicycle hydraulic device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the bicycle with facing the handlebar H. Accordingly, these terms, as utilized to describe the bicycle hydraulic device 10, should be interpreted relative to the bicycle equipped with the bicycle hydraulic device 10 as used in an upright riding position on a horizontal surface.

As seen in FIG. 1, the bicycle hydraulic device 10 comprises a base member 12. The base member 12 is configured to be mounted to the bicycle body B. In this embodiment, the base member 12 is configured to be mounted to the handlebar H of the bicycle body B. However, the base member 12 can be mounted to parts other than the handlebar H in the bicycle body B. The base member 12 includes a first end portion 12A, a second end portion 12B, and a grip portion 12C. The second end portion 12B is opposite to the first end portion 12A and is configured to be mounted to the bicycle body B. The grip portion 12C is provided between the first end portion 12A and the second end portion 12B. The base member 12 extends between the first end portion 12A and the second end portion 12B.

The drop-down handlebar H includes a curved part H1. The second end portion 12B is configured to be coupled to the curved part H1 in a mounting state where the bicycle hydraulic device 10 is mounted to the handlebar H. The bicycle hydraulic device 10 comprises a mounting clamp 14 to clamp the handlebar H between the base member 12 and the mounting clamp 14.

Figure 2:
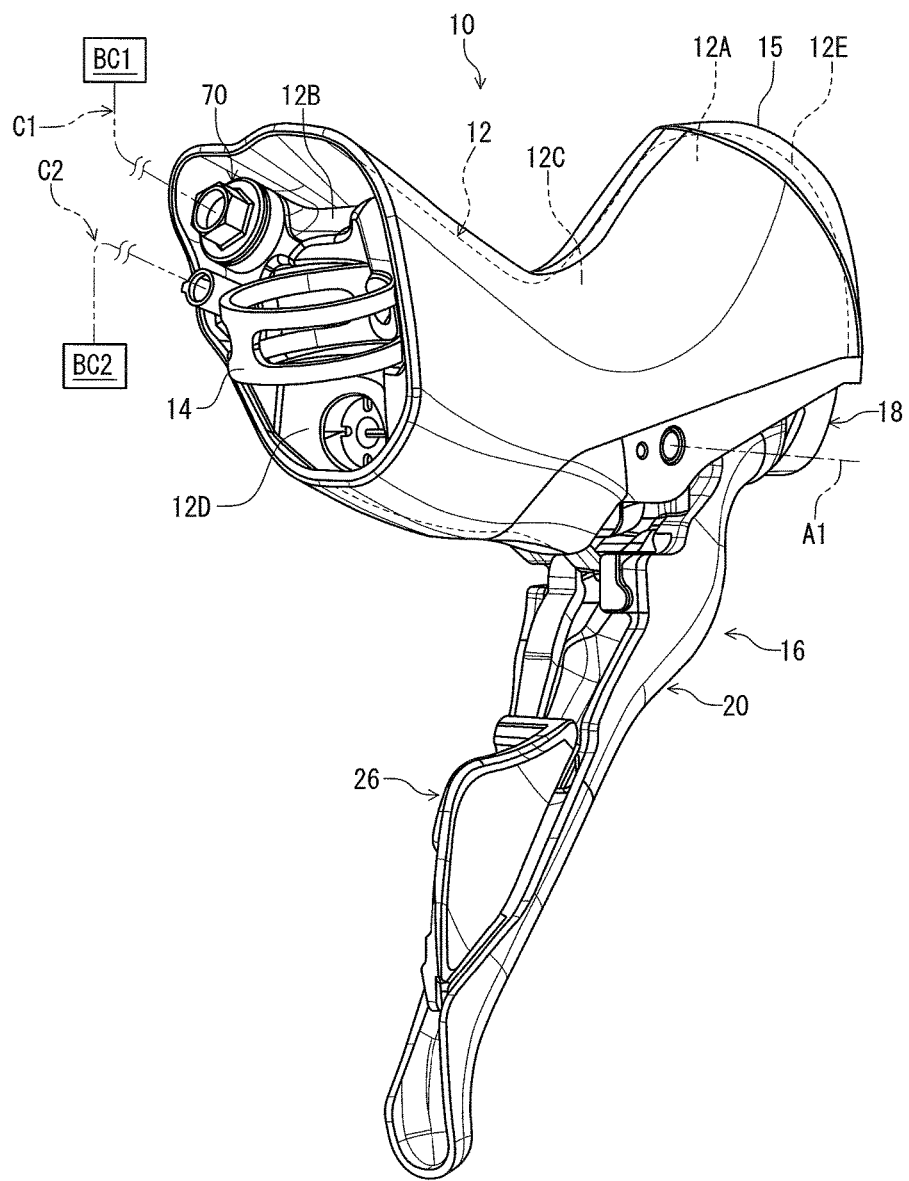
FIG. 2 is a perspective view of the bicycle hydraulic device illustrated in FIG. 1.

As seen in FIG. 2, the second end portion 12B includes a mounting surface 12D having a curved shape corresponding to the drop-down handlebar H. Specifically, the mounting surface 12D has the curved shape corresponding to an outer peripheral surface 82A of the curved part H1.

As seen in FIGS. 1 and 2, the first end portion 12A includes a pommel portion 12E. The pommel portion 12E extends obliquely upward from the grip portion 12C. The pommel portion 12E can also be configured to be graspable if needed and/or desired.

The base member 12 is made of a non-metallic material such as a resin material. In this embodiment, the base member 12 is made of a resin material. For example, the base member 12 is made of synthetic resin. The base member 12 is integrally formed by using integral molding. However, the base member 12 can be made of other materials such as a metallic material. For example, the base member 12 can be made of aluminum by using molding.

In this embodiment, the bicycle hydraulic device 10 further comprises a grip cover 15 attached to the base member 12 to at least partly cover the base member 12. The grip cover 15 is at least partly made of an elastic material such as rubber.

As seen in FIG. 1, the bicycle hydraulic device 10 comprises an operating member 16 pivotally coupled to the base member 12 about a pivot axis A1. The operating member 16 extends downward from the base member 12 in the mounting state of the bicycle hydraulic device 10. In this embodiment, the operating member 16 is pivotable relative to the base member 12 about the pivot axis A1 in a first operating direction D1. The operating member 16 is configured to be pivotable relative to the base member 12 between a rest position P11 (hereinafter the first rest position P11) and an operated position P12 (hereinafter the first operated position P12). The first operating direction D1 is a circumferential direction defined about the pivot axis A1. In this embodiment, the operating member 16 is provided as a brake operating lever pivotable about the pivot axis A1.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

Figure 3:
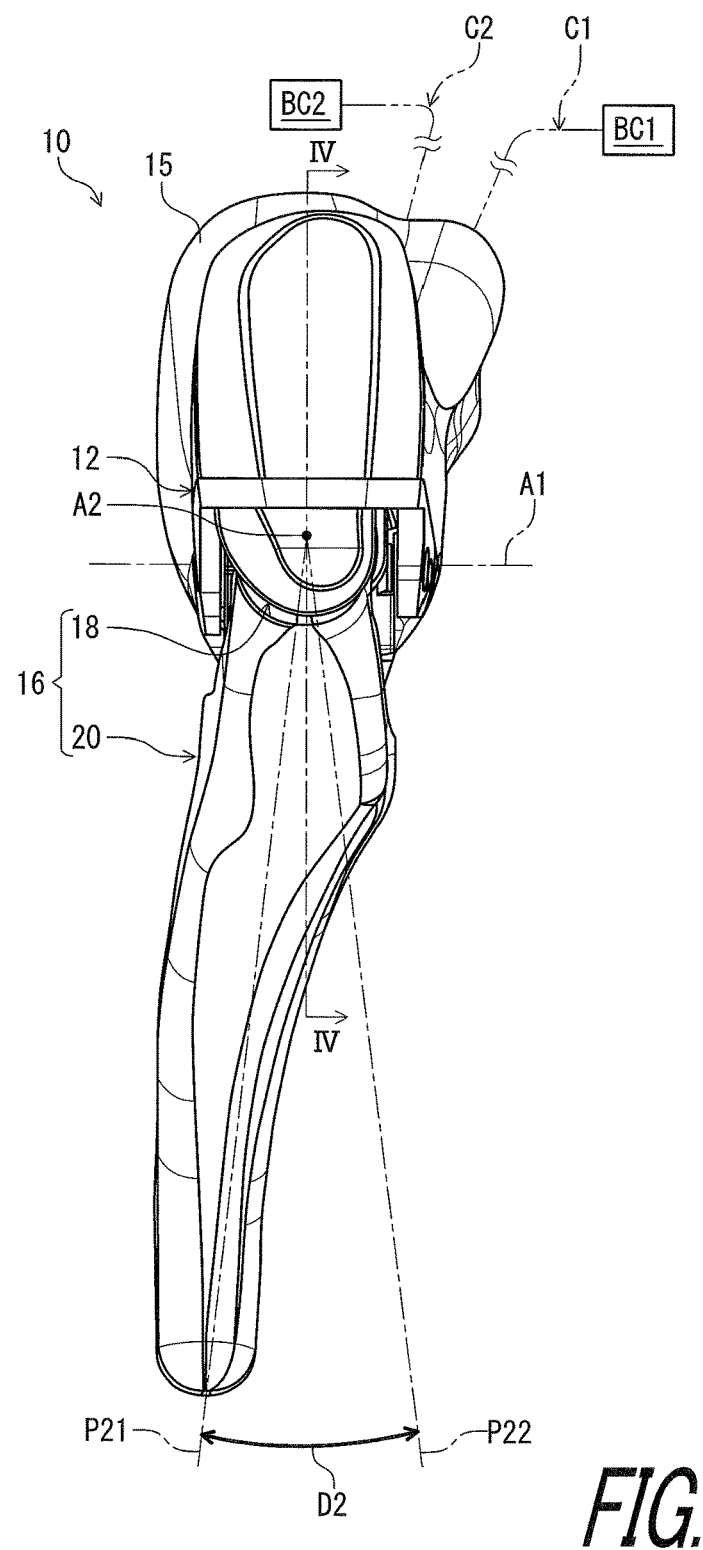
FIG. 3 is a front view of the bicycle hydraulic device illustrated in FIG. 1.

As seen in FIG. 3, the operating member 16 is pivotable relative to the base member 12 about the additional pivot axis A2 in a second operating direction D2. The operating member 16 is pivotable relative to the base member 12 between a second rest position P21 and a second operated position P22. The second operating direction D2 is a circumferential direction defined about the additional pivot axis A2. In this embodiment, the operating member 16 is provided as a shift lever pivotable about the additional pivot axis A2. However, the function of the shift lever can be omitted from the operating member 16.

As seen in FIGS. 1 and 3, the operating member 16 includes a base portion 18 and an operating portion 20. The base portion 18 is pivotally coupled to the base member 12 about the pivot axis A1. The operating portion 20 is pivotally provided on the base portion 18 about the additional pivot axis A2.

Figure 4:
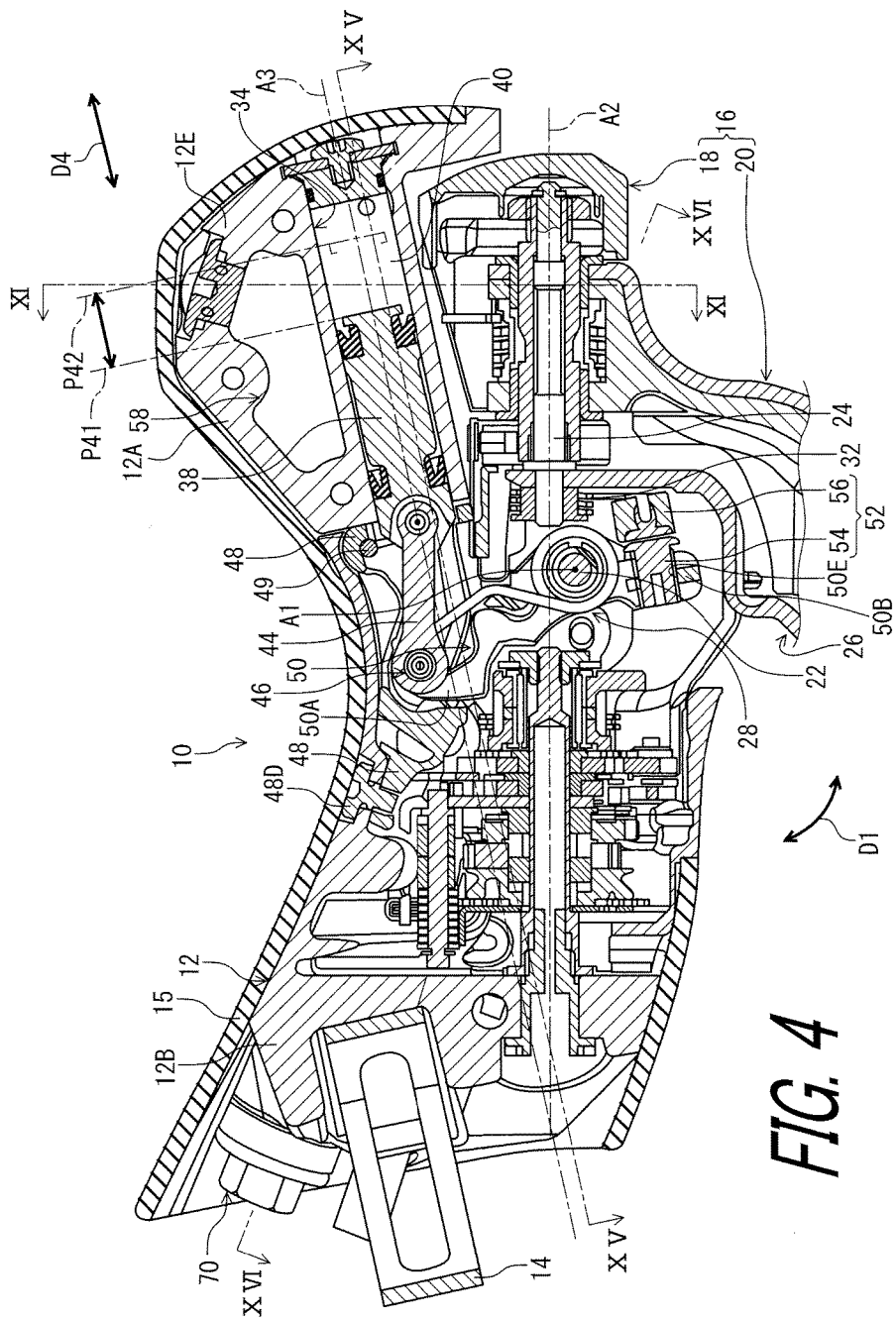
FIG. 4 is a partial cross-sectional view of the bicycle hydraulic device taken along line IV-IV of FIG. 3.

As seen in FIG. 4, the bicycle hydraulic device 10 comprises a pivot pin 22 and an additional pivot pin 24. The pivot pin 22 defines the pivot axis A1. The additional pivot pin 24 defines the additional pivot axis A2. The base portion 18 is pivotally coupled to the base member 12 via the pivot pin 22. The operating portion 20 is pivotally coupled to the base portion 18 about via the additional pivot pin 24.

Figure 5:
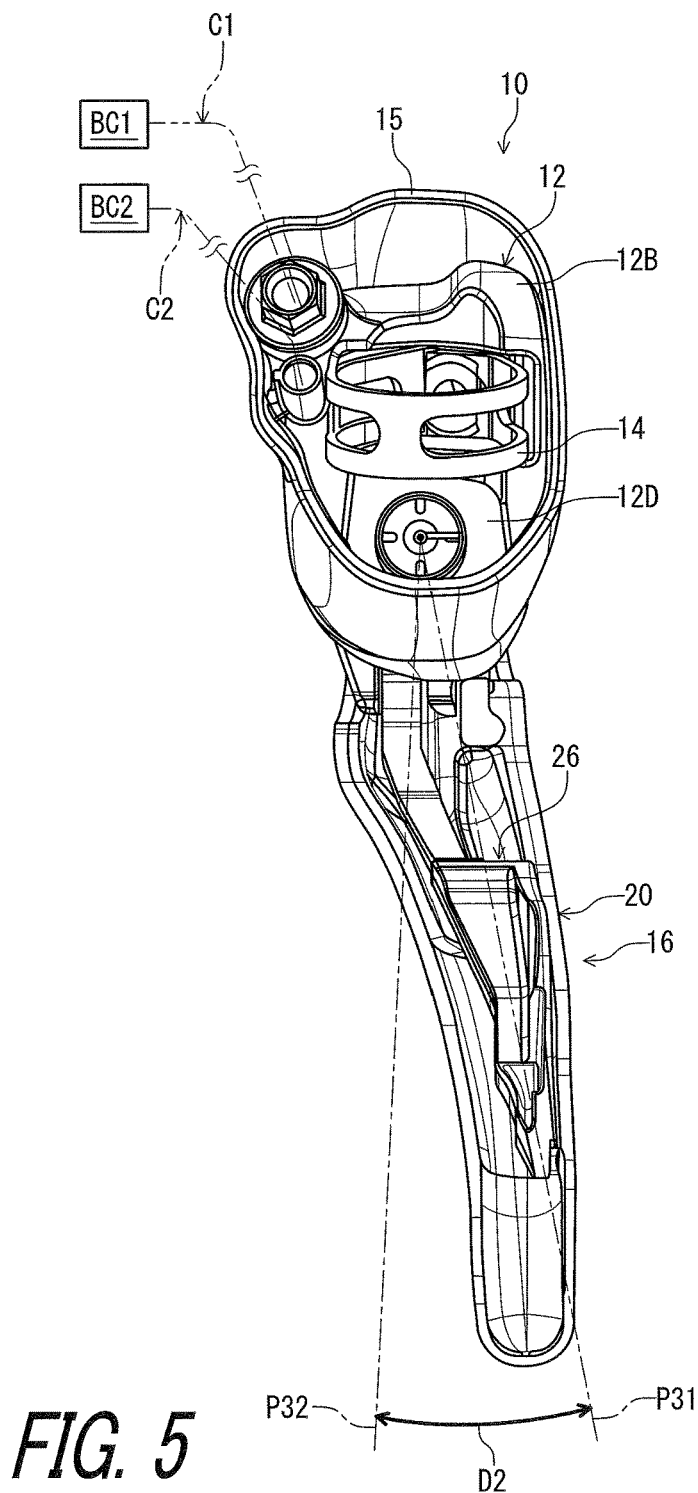
FIG. 5 is a rear view of the bicycle hydraulic device illustrated in FIG. 1.

As seen in FIGS. 1 and 5, the bicycle hydraulic device 10 further comprises an additional operating member 26. The additional operating member 26 is pivotally provided on one of the operating member 16 and the base member 12 about the additional pivot axis A2. In this embodiment, the additional operating member 26 is provided on the operating member 16. Specifically, the additional operating member 26 is pivotable relative to the base member 12 about the additional pivot axis A2 in the second operating direction D2. The additional operating member 26 is pivotable relative to the base member 12 between a third rest position P31 and a third operated position P32. The additional operating member 26 is pivotally coupled to the base portion 18 via the additional pivot pin 24. The additional operating member 26 is pivotable relative to the base portion 18 about the additional pivot axis A2. In this embodiment, the additional operating member 26 is provided as an additional shift lever pivotable about the additional pivot axis A2. The additional operating member 26 can be omitted from the bicycle hydraulic device 10.

As seen in FIG. 4, the bicycle hydraulic device 10 comprises a first biasing member 28 to bias the operating member 16 toward the first rest position P11 (FIG. 1) relative to the base member 12. The first biasing member 28 is mounted on the pivot pin 22. The base portion 18 is in contact with the base member 12 in a rest state where the operating member 16 is at the first rest position P11. For example, the first biasing member 28 includes a torsion spring.

The bicycle hydraulic device 10 comprises a second biasing member 30 to bias the operating member 16 toward the second rest position P21 (FIG. 3) relative to the base member 12. In this embodiment, the second biasing member 30 biases the operating portion 20 toward the second rest position P21 (FIG. 3) relative to the base portion 18. The second biasing member 30 is mounted on the additional pivot pin 24. The operating portion 20 is in contact with the base portion 18 in a state where the operating portion 20 is at the second rest position. For example, the second biasing member 30 includes a torsion spring.

The bicycle hydraulic device 10 comprises a third biasing member 32 to bias the additional operating member 26 toward the third rest position P31 (FIG. 5) relative to the base member 12. In this embodiment, the third biasing member 32 biases the additional operating member 26 toward the third rest position P31 (FIG. 5) relative to the operating member 16 (the base portion 18). The third biasing member 32 is mounted on the additional pivot pin 24. As seen in FIG. 5, the additional operating member 26 is in contact with the operating member 16 (the operating portion 20) in a state where the operating member 16 and the additional operating member 26 are at the second rest position P21 and the third rest position P31. For example, the third biasing member 32 includes a torsion spring.

Figure 6:
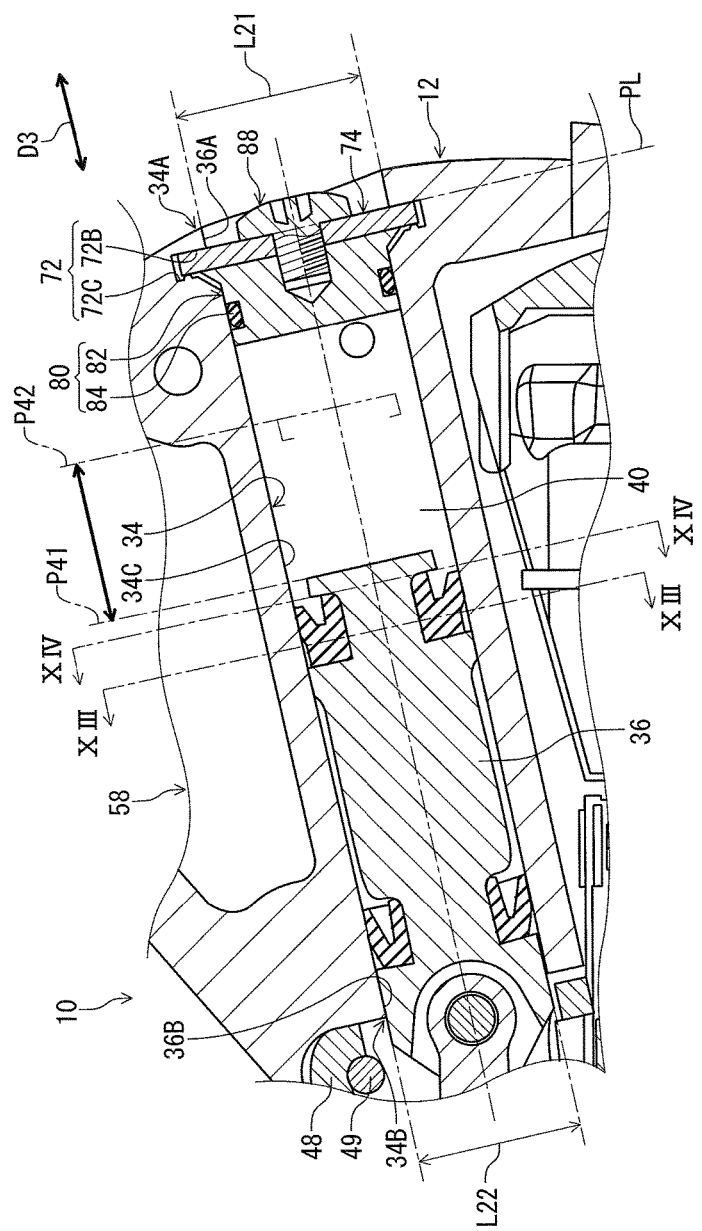
FIG. 6 is a partial enlarged cross-sectional view of the bicycle hydraulic device illustrated in FIG. 1.

As seen in FIG. 6, the base member 12 comprises a hydraulic bore 34. The hydraulic bore 34 has a first end 34A and a second end 34B. The first end 34A defines a first opening 36A. The second end 34B defines a second opening 36B. Namely, the hydraulic bore 34 includes a through-hole. The hydraulic bore 34 defines a center axis A3. The hydraulic bore 34 extends between the first end 34A and the second end 34B in an axial direction D3 along the center axis A3. Specifically, the hydraulic bore 34 extends between the first end 34A and the second end 34B in an axial direction D3 parallel to the center axis A3.

The bicycle hydraulic device 10 further comprises a piston 38 movably provided in the hydraulic bore 34 to be removable from the second opening 36B. The piston 38 defines a hydraulic chamber 40 in the hydraulic bore 34. The piston 38 is movable relative to the base member 12 in the axial direction D3 in response to the movement of the operating member 16 in the first operating direction D1.

Specifically, the piston 38 is movable relative to the base member 12 between an initial position P41 and an actuated position P42. The initial position P41 corresponds to the first rest position P11 (FIG. 1) of the operating member 16. The actuated position P42 corresponds to the first operated position P12 (FIG. 2) of the operating member 16.

Specifically, the piston 38 is at the initial position P41 in the rest state where the operating member 16 is at the first rest position P11 (FIG. 1). The piston 38 is at the actuated position P42 in an operated state where the operating member 16 is at the first operated position P12 (FIG. 1). The piston 38 is configured to be pushed from the initial position P41 to the actuated position P42 in response to the movement of the operating member 16 from the first rest position P11 toward the first operated position P12 to supply a hydraulic pressure toward at least one bicycle component BC1.

The piston 38 extends through the second opening 36B in an initial state where the piston 38 is at the initial position. The piston 38 is closer to the second end 34B than to the first end 34A in the initial state of the piston 38.

Figure 7:
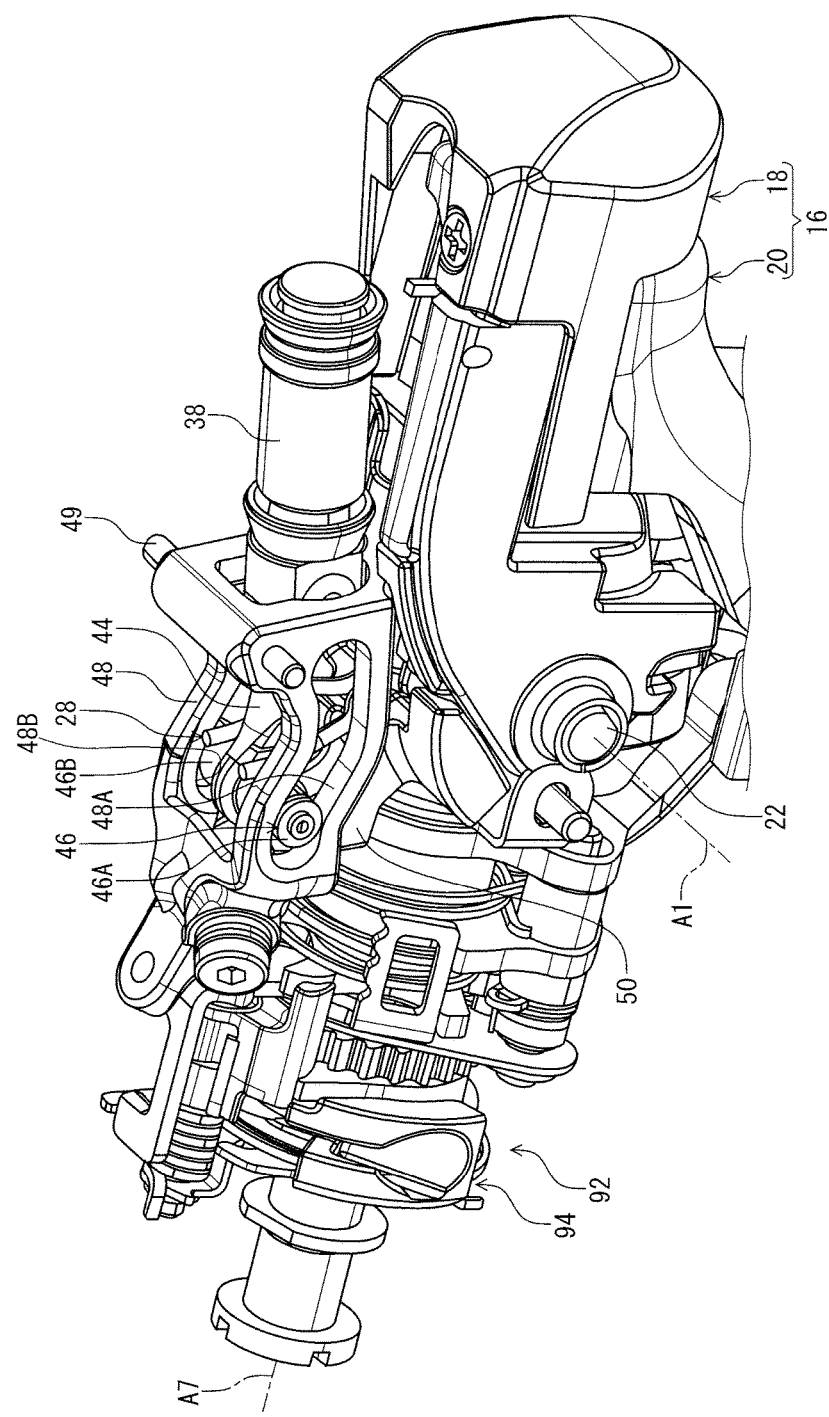
FIG. 7 is a perspective view of an internal structure of the bicycle hydraulic device illustrated in FIG. 1.
Figure 8:
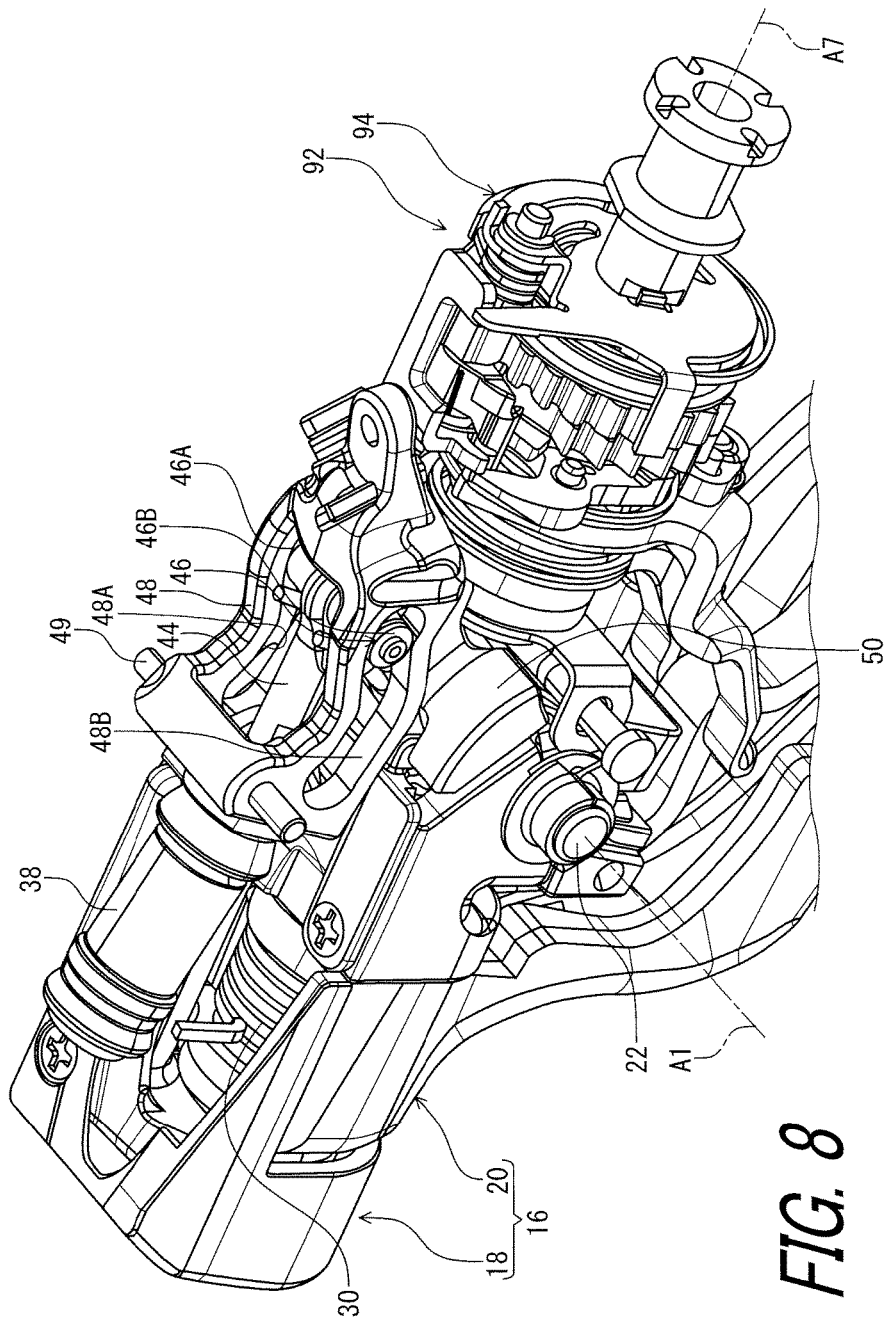
FIG. 8 is another perspective view of the internal structure of the bicycle hydraulic device illustrated in FIG. 1.

As seen in FIGS. 4, 7, and 8, the bicycle hydraulic device 10 comprises a piston rod 44, a guide pin 46, a guide member 48, a support shaft 49, and a transmitting member 50. The piston rod 44 is operatively coupled to the piston 38. The guide pin 46 is attached to the piston rod 44. The support shaft 49 couples the guide member 48 to the base member 12. The guide member 48 includes a pair of guide grooves 48A and 48B. Both ends 46A and 46B of the guide pin 46 are movably provided in the guide grooves 48A and 48B. At least one of the ends 46A and 46B can include a roller. The first biasing member 28 biases the guide pin 46. The guide grooves 48A and 48B change a lever ratio defined between the operating member 16 and the piston 38. The lever ratio is defined as a ratio of an amount of movement of the piston 38 to an amount of pivotal movement of the operating member 16. The guide grooves 48A and 48B gradually decreases the lever ratio when the piston 38 is moved from the initial position P41 to the actuated position P42 relative to the base member 12.

In this embodiment, the piston 38, the piston rod 44, the guide pin 46, and the guide member 48 are attachable to and detachable from the base member 12 as a single unit. The guide member 48 is a separate member from the base member 12 and is made of a metallic material such as a titanium alloy, a stainless steel and an aluminum alloy. The guide member 48 is detachably attached to the base member 12 with a fastener 48D (FIG. 4).

As seen in FIG. 4, the transmitting member 50 is pivotable relative to the base member 12 about the pivot axis A1 to transmit the movement of the operating member 16 to the guide pin 46. The transmitting member 50 includes a first transmitting end 50A and a second transmitting end 50B. The first transmitting end 50A is in contact with the guide pin 46. The second transmitting end 50B is disposed opposite the first transmitting end 50A relative to the pivot axis A1.

Figure 9:
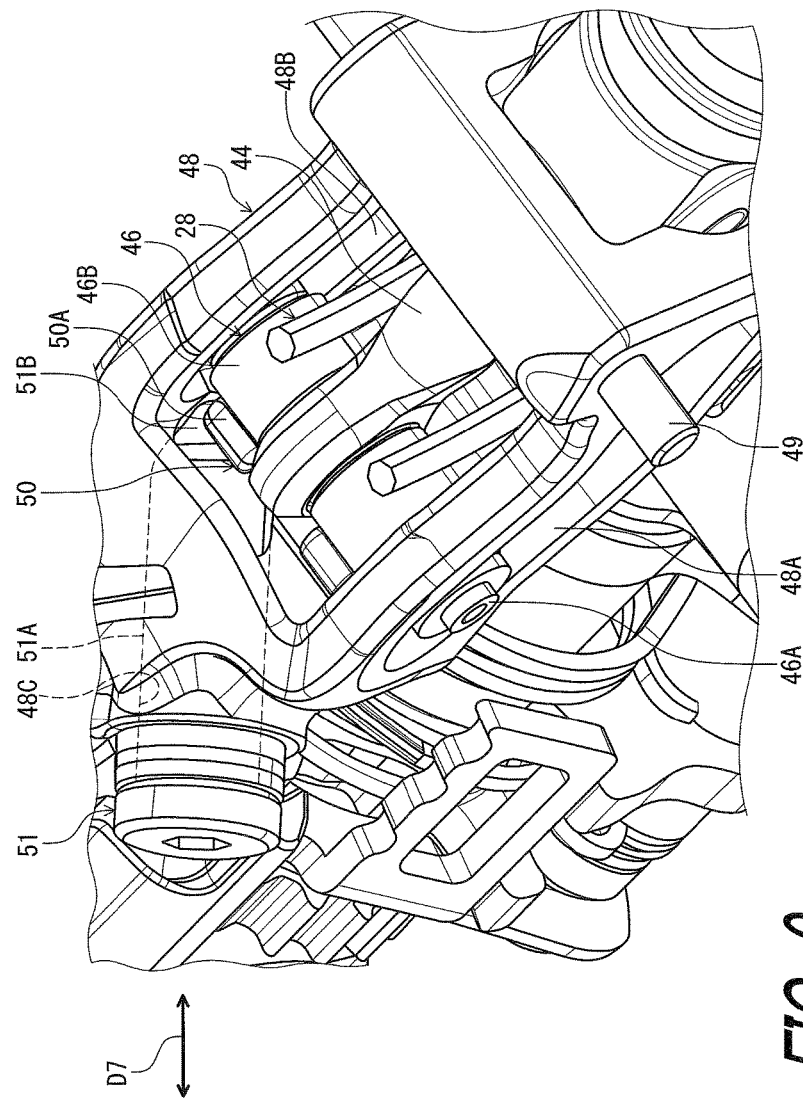
FIG. 9 is another perspective view of the internal structure of the bicycle hydraulic device illustrated in FIG. 1.

As seen in FIG. 9, the bicycle hydraulic device 10 comprises an adjustment member 51. The adjustment member 51 is movably attached to the guide member 48. Specifically, the adjustment member 51 includes an externally threaded portion 51A. The guide member 48 includes an additional adjustment threaded hole 48C. The externally threaded portion 51A is threadedly engaged with the additional adjustment threaded hole 48C. The adjustment member 51 includes an adjustment end 51B. The adjustment end 51B is in contact with the first transmitting end 50A of the transmitting member 50. For example, the adjustment end 51B of the adjustment member 51 has a tapered shape. The first biasing member 28 biases the guide pin 46 and the first transmitting end 50A toward the adjustment end 51B of the adjustment member 51. The guide pin 46 and the first transmitting end 50A are held between the first biasing member 28 and the adjustment end 51B of the adjustment member 51. This positions the piston 38 at the initial position P41 (FIG. 4). Furthermore, the transmitting member 50 is positioned at a pivotal position corresponding to the initial position P41 relative to the guide member 48 and the base member 12.

Rotation of the adjustment member 51 relative to the guide member 48 changes a position of the adjustment member 51 relative to the guide member 48 in an adjustment direction D7 which is non-parallel to the center axis A3 (FIG. 4) of the hydraulic bore 34. Thus, the rotation of the adjustment member 51 changes the initial position P41 (FIG. 4) of the piston 38 relative to the base member 12. Furthermore, the rotation of the adjustment member 51 changes the pivotal position of the transmitting member 50 relative to the base member 12.

As seen in FIG. 4, the bicycle hydraulic device 10 comprises an additional adjustment member 52. The additional adjustment member 52 is rotatably attached to the second transmitting end 50B. The additional adjustment member 52 includes an adjustment screw 54 and an adjustment contact part 56. The transmitting member 50 includes an adjustment threaded hole 50C disposed at the second transmitting end 50B. The adjustment screw 54 is threadedly engaged with the adjustment threaded hole 50C. The adjustment contact part 56 is rotatably coupled to an end of the adjustment screw 54. The adjustment contact part 56 is coupled to the base portion 18 to be restricted from rotating relative to the base portion 18.

Figure 10:
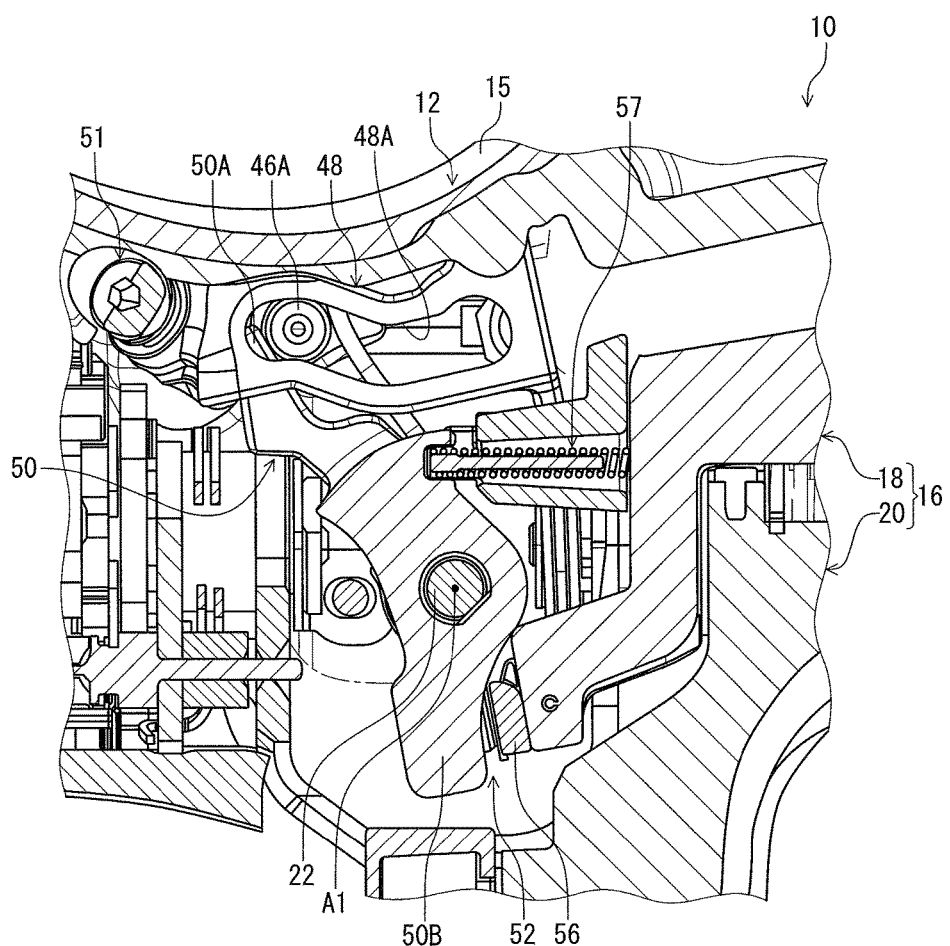
FIG. 10 is a cross-sectional view of the bicycle hydraulic device illustrated in FIG. 1.

As seen in FIG. 10, the bicycle hydraulic device 10 comprises an adjustment biasing element 57 provided between the transmitting member 50 and the base portion 18 to apply a biasing force to the transmitting member 50 and the base portion 18. The adjustment biasing element 57 biases the transmitting member 50 and the base portion 18 to push the base portion 18 against the adjustment contact part 56.

As seen in FIG. 9, the rotation of the adjustment member 51 changes the pivotal position of the transmitting member 50 relative to the base member 12. Thus, the rotation of the adjustment member 51 changes the first rest position P11 of the operating member 16 relative to the base member 12. Furthermore, as seen in FIG. 4, rotation of the adjustment screw 54 relative to the transmitting member 50 changes a distance between the second transmitting end 50B and the base portion 18, changing the first rest position P11 of the operating member 16 relative to the base member 12. At this time, the initial position P41 of the piston 38 is not changed since the first transmitting end 50A of the transmitting member 50 is held between the guide pin 46 and the adjustment member 51 (FIG. 9).

Figure 11:
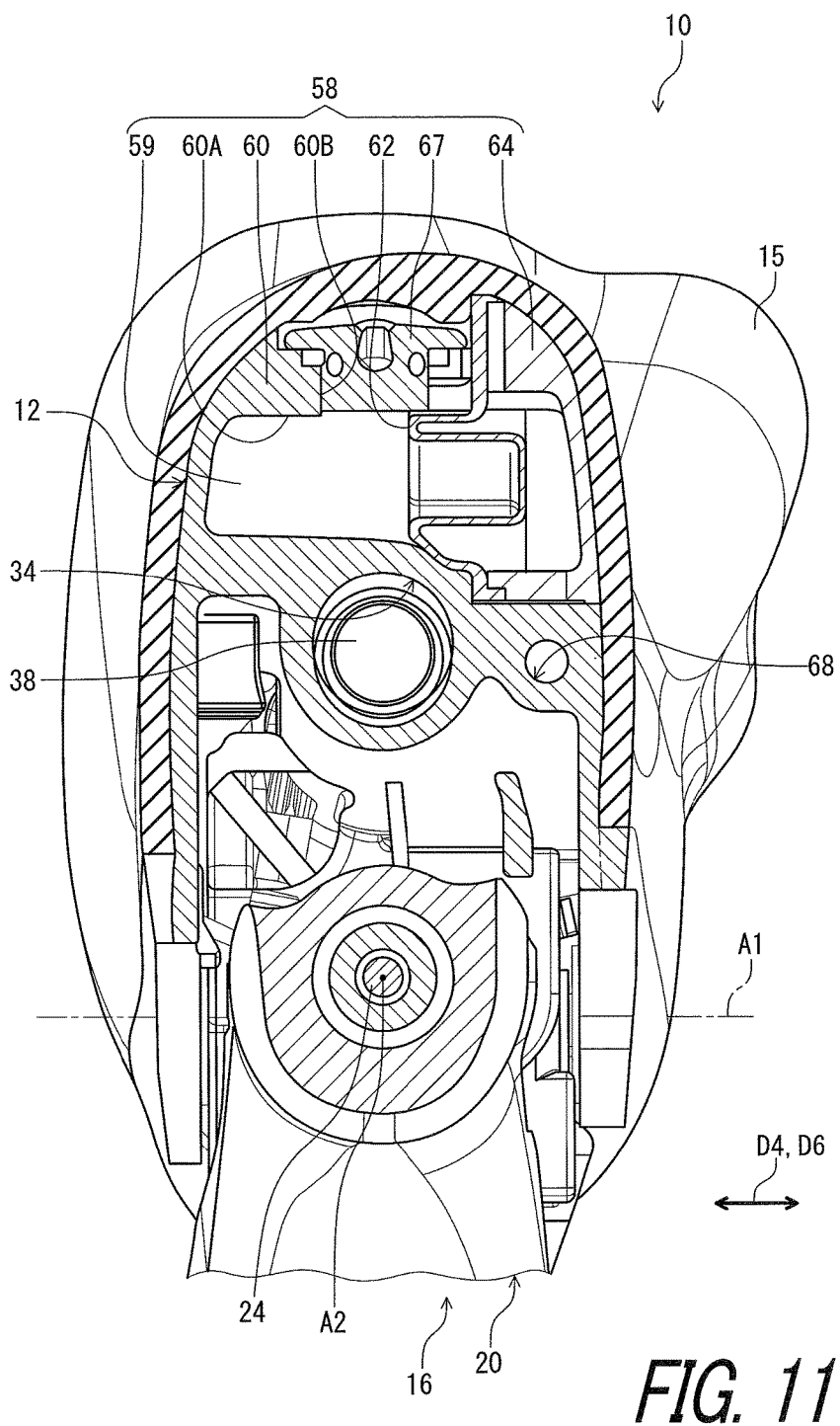
FIG. 11 is a cross-sectional view of the bicycle hydraulic device taken along line XI-XI of FIG. 4.
Figure 12:
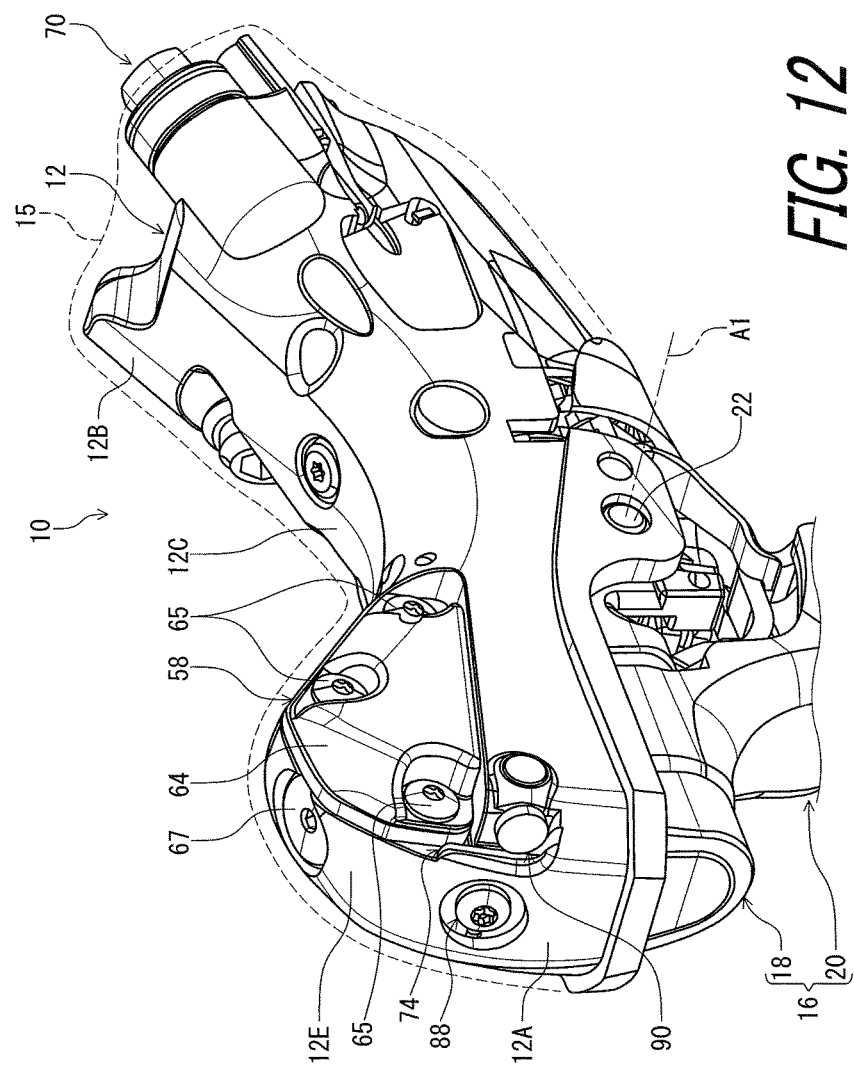
FIG. 12 is a perspective view of the bicycle hydraulic device illustrated in FIG. 1, with a grip cover omitted.

As seen in FIG. 11, the bicycle hydraulic device 10 comprises a hydraulic reservoir 58. The hydraulic reservoir 58 includes a reservoir chamber 59 connected to a hydraulic chamber 40 provided in the hydraulic bore 34. As seen in FIG. 4, the hydraulic reservoir 58 is provided at the first end portion 12A. In this embodiment, the hydraulic reservoir 58 is provided at the pommel portion 12E.

The hydraulic reservoir 58 includes a reservoir tank 60, a diaphragm 62, and a lid 64. The reservoir tank 60 includes a recess 60A. In this embodiment, the reservoir tank 60 is integrally provided with the hydraulic cylinder 36 as a one-piece unitary member. However, the reservoir tank 60 can be a separate member from the hydraulic cylinder 36. The diaphragm 62 is at least partly disposed in the recess 60A. The reservoir tank 60 and the diaphragm 62 define the reservoir chamber 59 in the recess 60A. In this embodiment, the hydraulic reservoir 58 includes a bleed member 67. The bleed member 67 is detachably attached to the reservoir tank 60 to close a hole 60B of the reservoir tank 60. The reservoir tank 60, the diaphragm 62, and the bleed member 67 define the reservoir chamber 59 in the recess 60A. As seen in FIGS. 8 and 11, the lid 64 is detachably attached to the base member 12 with fasteners 65 to cover the recess 60A. The reservoir tank 60 includes an attachment surface 60C. The recess 60A includes a reservoir opening 60D provided on the attachment surface 60C. The reservoir opening 60D is covered with the diaphragm 62. The lid 64 is attached to the attachment surface 60C to hold the diaphragm 62 between the lid 64 and the attachment surface 60C. The hydraulic reservoir 58 can be omitted from the bicycle hydraulic device 10.

Figure 13:
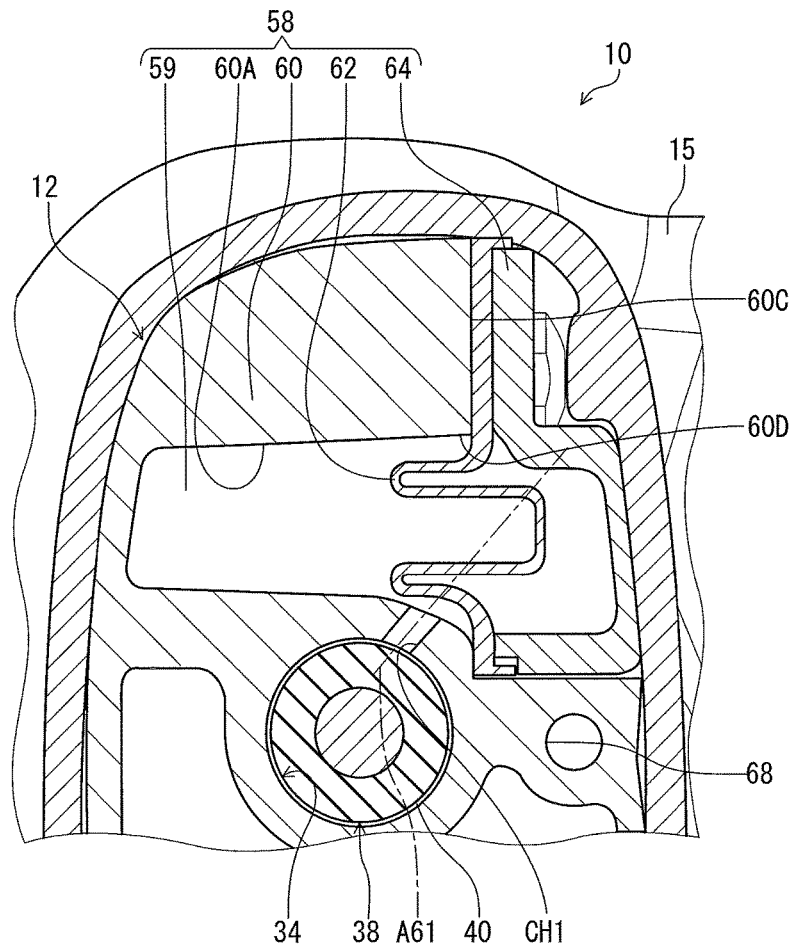
FIG. 13 is a cross-sectional view of the bicycle hydraulic device taken along line XIII-XIII of FIG. 6.

As seen in FIG. 13, the hydraulic reservoir 58 includes a first connection hole CH1 connecting the reservoir chamber 59 to the hydraulic chamber 40. The first connection hole CH1 has a first center axis A61 and extends along the first center axis A61. The first center axis A61 of the first connection hole CH1 is inclined relative to the attachment surface 60C of the reservoir tank 60. The first connection hole CH1 is non-parallel to and non-perpendicular to the attachment surface 60C. However, the arrangement of the first connection hole CH1 is not limited to this embodiment.

Figure 14:
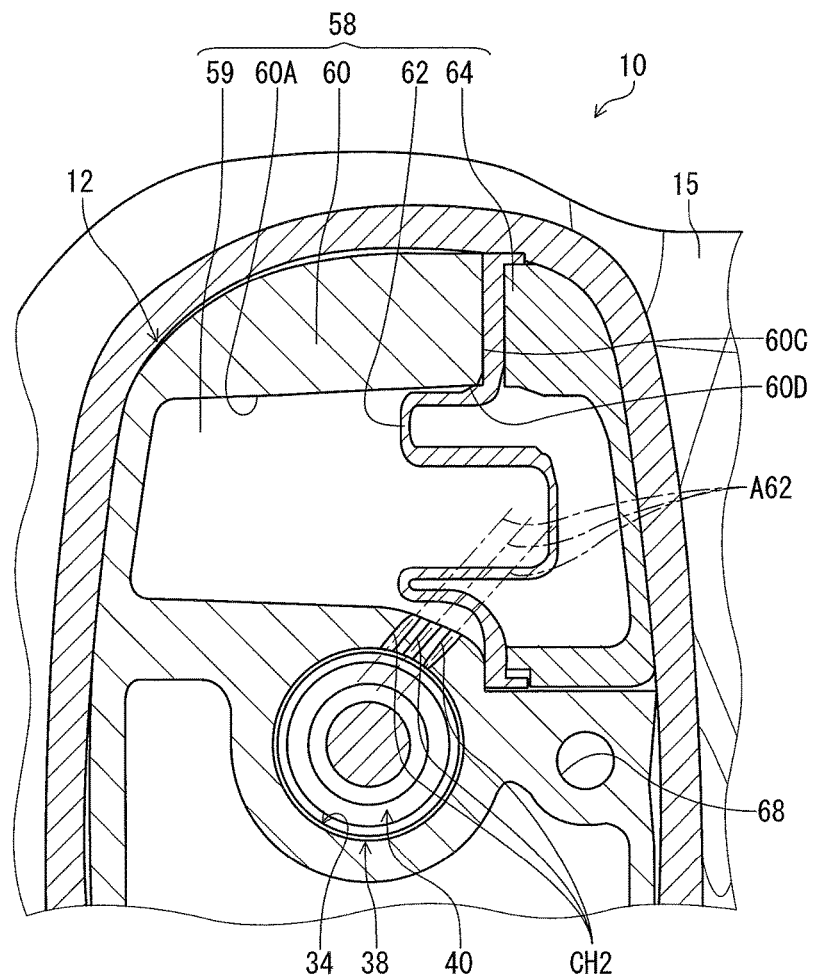
FIG. 14 is a cross-sectional view of the bicycle hydraulic device taken along line XIV-XIV of FIG. 6.

As seen in FIG. 14, the hydraulic reservoir 58 includes second connection holes CH2 connecting the reservoir chamber 59 to the hydraulic chamber 40. Each of the second connection holes CH2 has a second center axis A62 and extends along the second center axis A62. The second center axis A62 of the second connection hole CH2 is inclined relative to the attachment surface 60C of the reservoir tank 60. The second connection hole CH2 is non-parallel to and non-perpendicular to the attachment surface 60C. A second diameter of each of the second connection holes CH2 is smaller than a first diameter of the first connection hole CH1. However, the second diameter can be equal to or larger than the first diameter. The arrangement of the second connection holes CH2 is not limited to this embodiment. At least one of the second connection holes CH2 can be omitted from the hydraulic reservoir 58. As seen in FIGS. 13 and 14, a first inclination angle defined between the first center axis A61 and the attachment surface 60C is equal to a second inclination angle defined between the second center axis A62 and the attachment surface 60C. However, the first inclination angle can be different from the second inclination angle.

As seen in FIGS. 4 and 11, the hydraulic bore 34 is at least partly provided above the pivot axis A1 in the mounting state where the bicycle hydraulic device 10 is mounted to the handlebar H (FIG. 1). The reservoir chamber 59 is provided above the hydraulic bore 34 without overlapping with the hydraulic bore 34 in a transverse direction D6 parallel to the pivot axis A1 in the mounting state.

Figure 15:
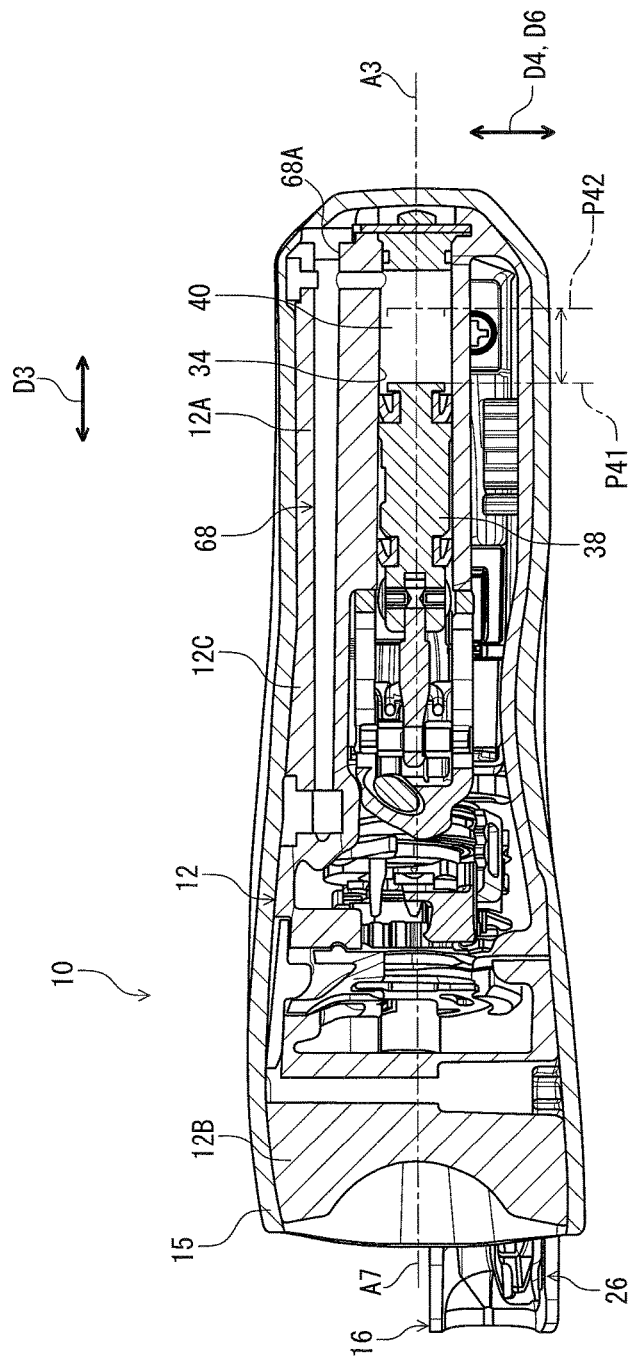
FIG. 15 is a cross-sectional view of the bicycle hydraulic device taken along line XV-XV of FIG. 4.
Figure 16:
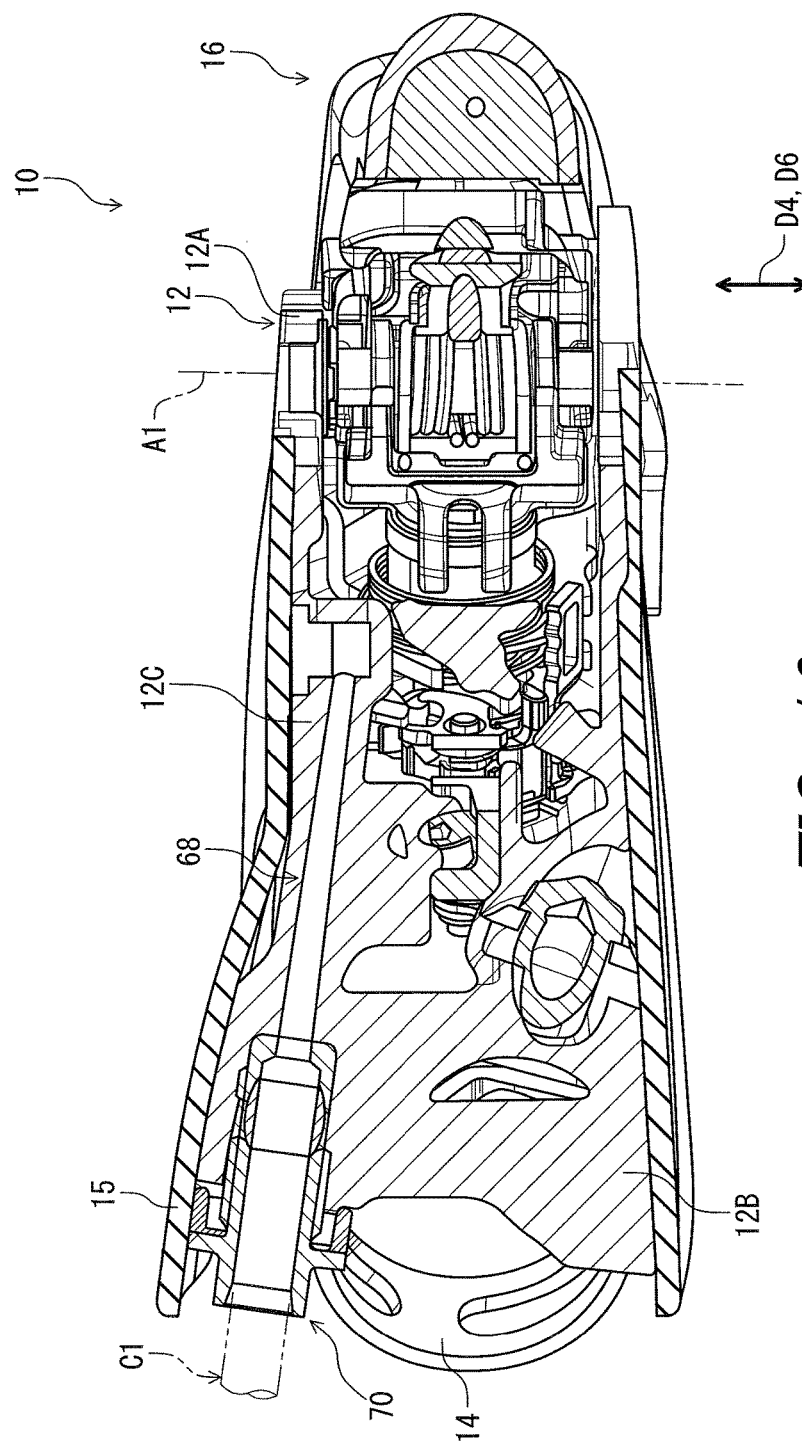
FIG. 16 is a cross-sectional view of the bicycle hydraulic device taken along line XVI-XVI of FIG. 4.

As seen in FIG. 15, the base member 12 include a fluid passageway 68 connected to the hydraulic bore 34. The fluid passageway 68 is provided inside the base member 12. As seen in FIG. 16, the base member 12 includes an outlet port 70. The outlet port 70 is connected to the fluid passageway 68 and is provided at the second end portion 12B. The fluid passageway 68 is defined from the hydraulic chamber 40 to the outlet port 70. The hydraulic hose C1 is connected to the hydraulic chamber 40 via the outlet port 70. An end of the hydraulic hose C1 is connected to the outlet port 70.

Figure 17:
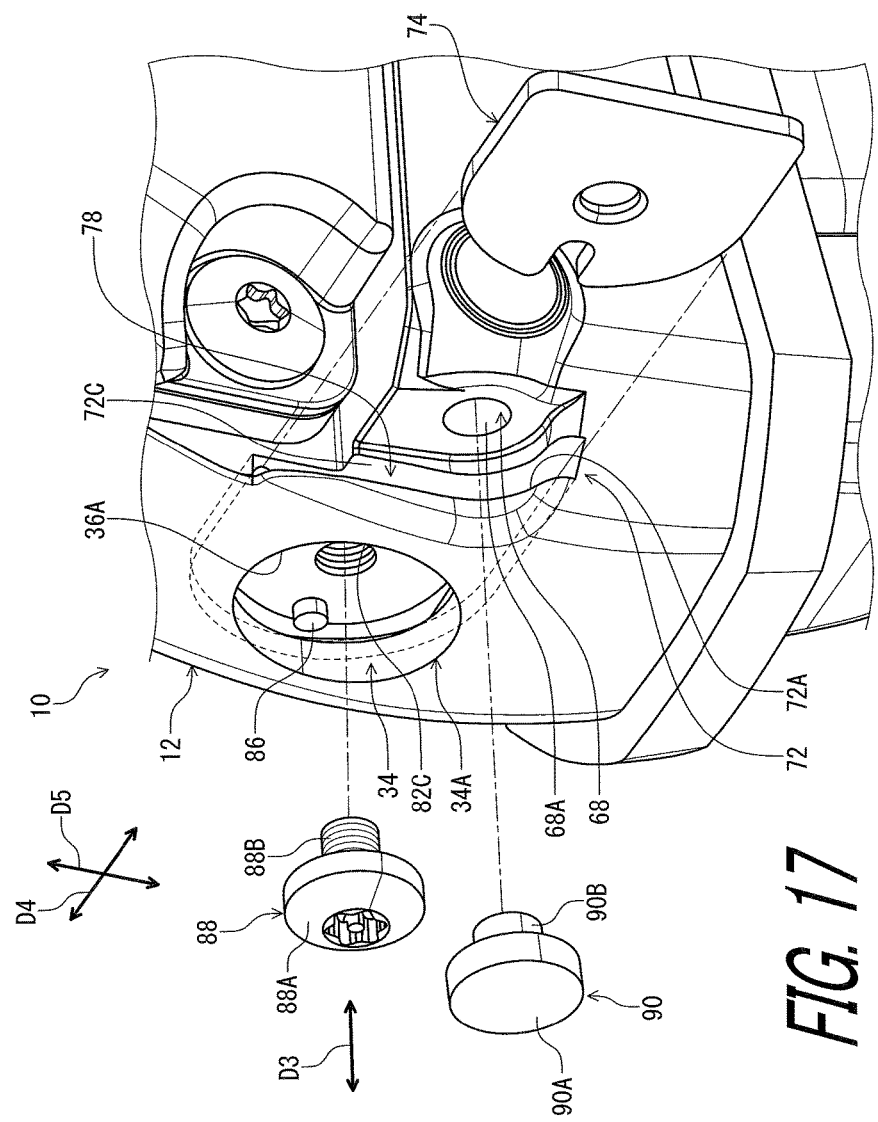
FIG. 17 is a partial exploded perspective view of the bicycle hydraulic device illustrated in FIG. 1, with the grip cover omitted.

As seen in FIG. 6, the base member 12 comprises an insertion portion 72 provided between the first end 34A and the second end 34B. The insertion portion 72 is provided closer to the first end 34A than to the second end 34B. As seen in FIG. 17, the insertion portion 72 includes an insertion opening 72A. The insertion opening 72A is different from the first opening 36A. The insertion opening 72A is different from the second opening 36B (FIG. 6).

Figure 18:
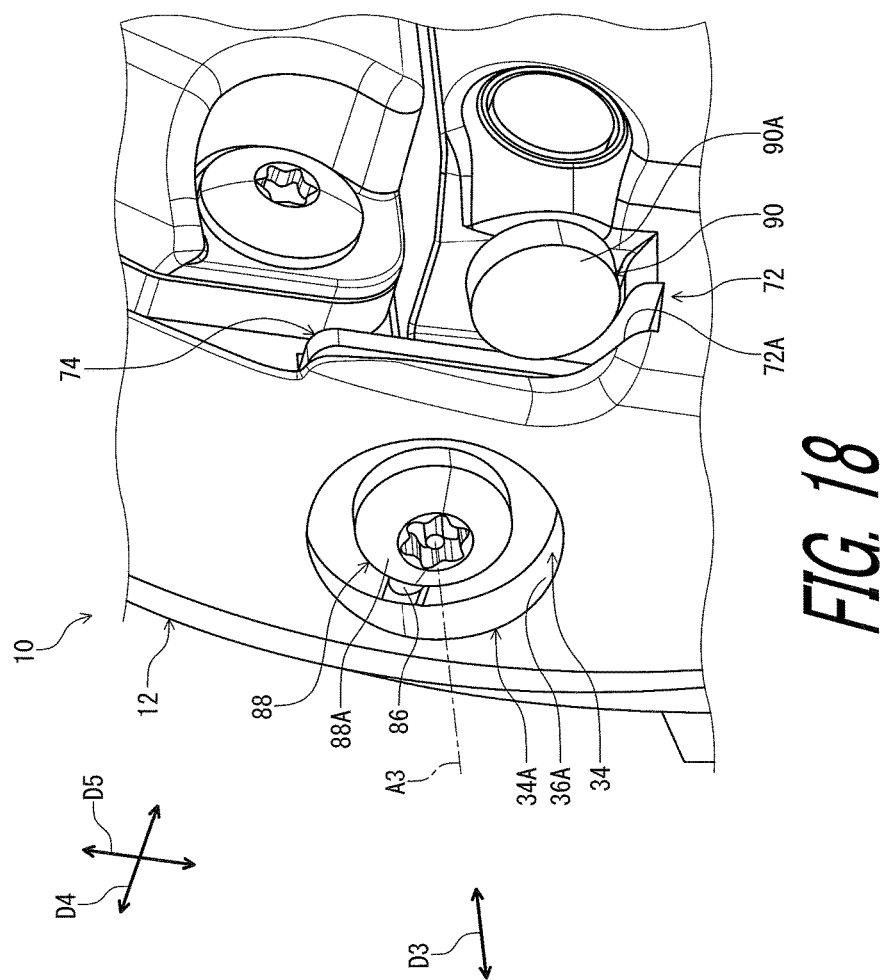
FIG. 18 is a partial perspective view of the bicycle hydraulic device illustrated in FIG. 1, with the grip cover omitted.
Figure 19:
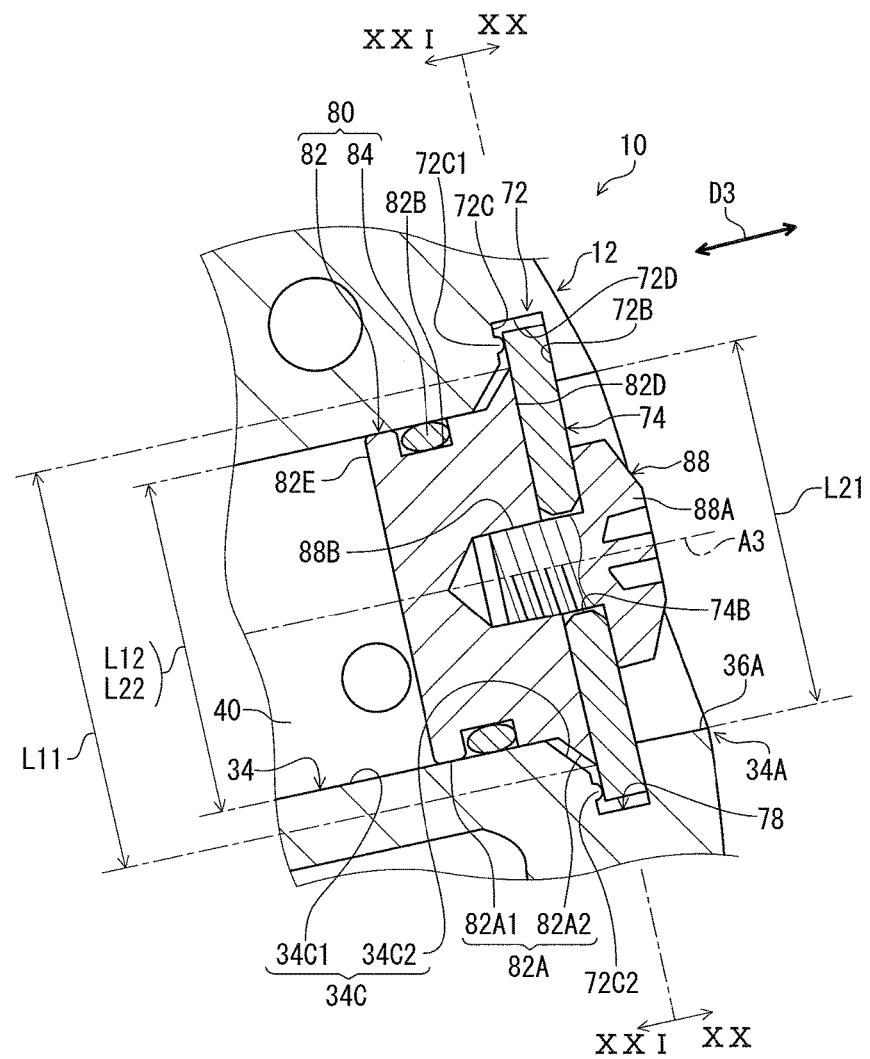
FIG. 19 is a partial enlarged cross-sectional view of the bicycle hydraulic device illustrated in FIG. 1.

As seen in FIGS. 18 and 19, the bicycle hydraulic device 10 comprises a cover member 74. The cover member 74 is provided at the insertion portion 72 via the insertion opening 72A to cover the hydraulic bore 34. The cover member 74 is provided on the base member 12 to define the hydraulic chamber 40 between the cover member 74 and the piston 38 in the hydraulic bore 34.

As seen in FIG. 19, the insertion portion 72 includes a first surface 72B extending along a plane PL facing the second end 34B (FIG. 6). The cover member 74 is contactable with the first surface 72B. The plane PL including the first surface 72B is perpendicular to the center axis A3. The insertion portion 72 includes a second surface 72C spaced apart from the first surface 72B to face the first surface 72B. The cover member 74 is at least partly provided between the first surface 72B and the second surface 72C. The cover member 74 is contactable with the second surface 72C. The insertion portion 72 restricts a movement of the cover member 74 relative to the base member 12 in the axial direction D3. In this embodiment, the insertion portion 72 is integrally provided with the base member 12 as a one-piece unitary member. However, the insertion portion 72 can be a separate member from the base member 12.

Figure 20:
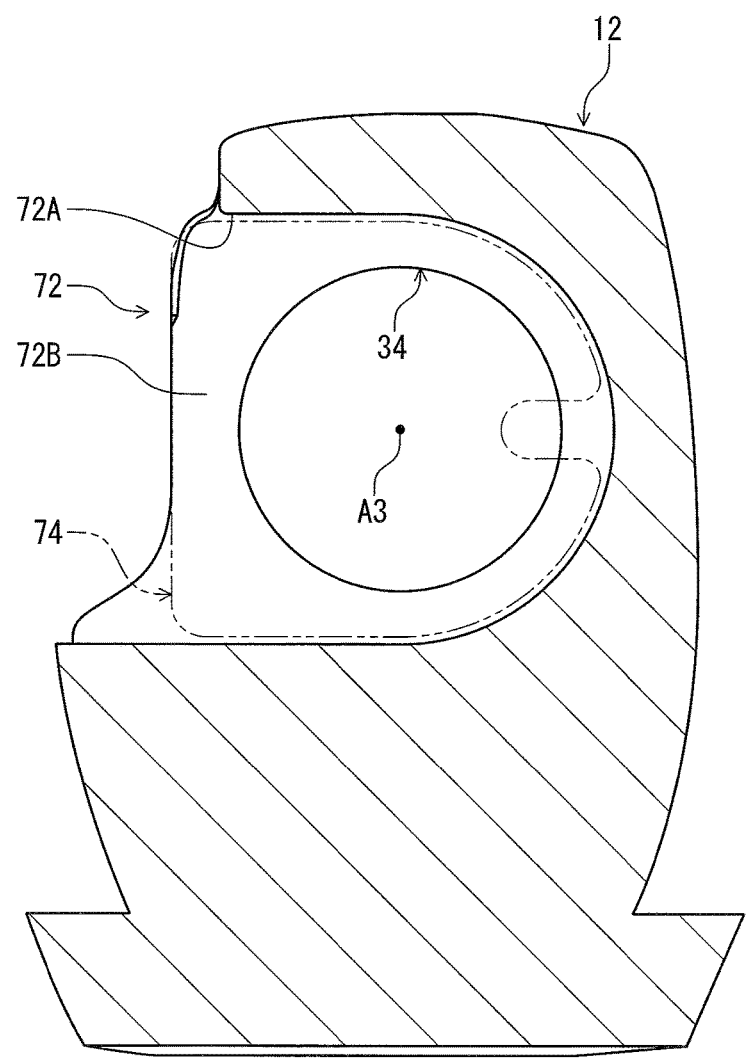
FIG. 20 is a cross-sectional view of the bicycle hydraulic device taken along line XX-XX of FIG. 19, with the grip cover and a cover member omitted.

As seen in FIG. 20, the first surface 72B extends about the center axis A3. The first surface 72B extends about the hydraulic bore 34 when viewed from the axial direction D3 parallel to the center axis A3. The first surface 72B has a substantially annular shape and surrounds the hydraulic bore 34 when viewed from the axial direction D3 parallel to the center axis A3. However, the shape of the first surface 72B is not limited to this embodiment.

Figure 21:
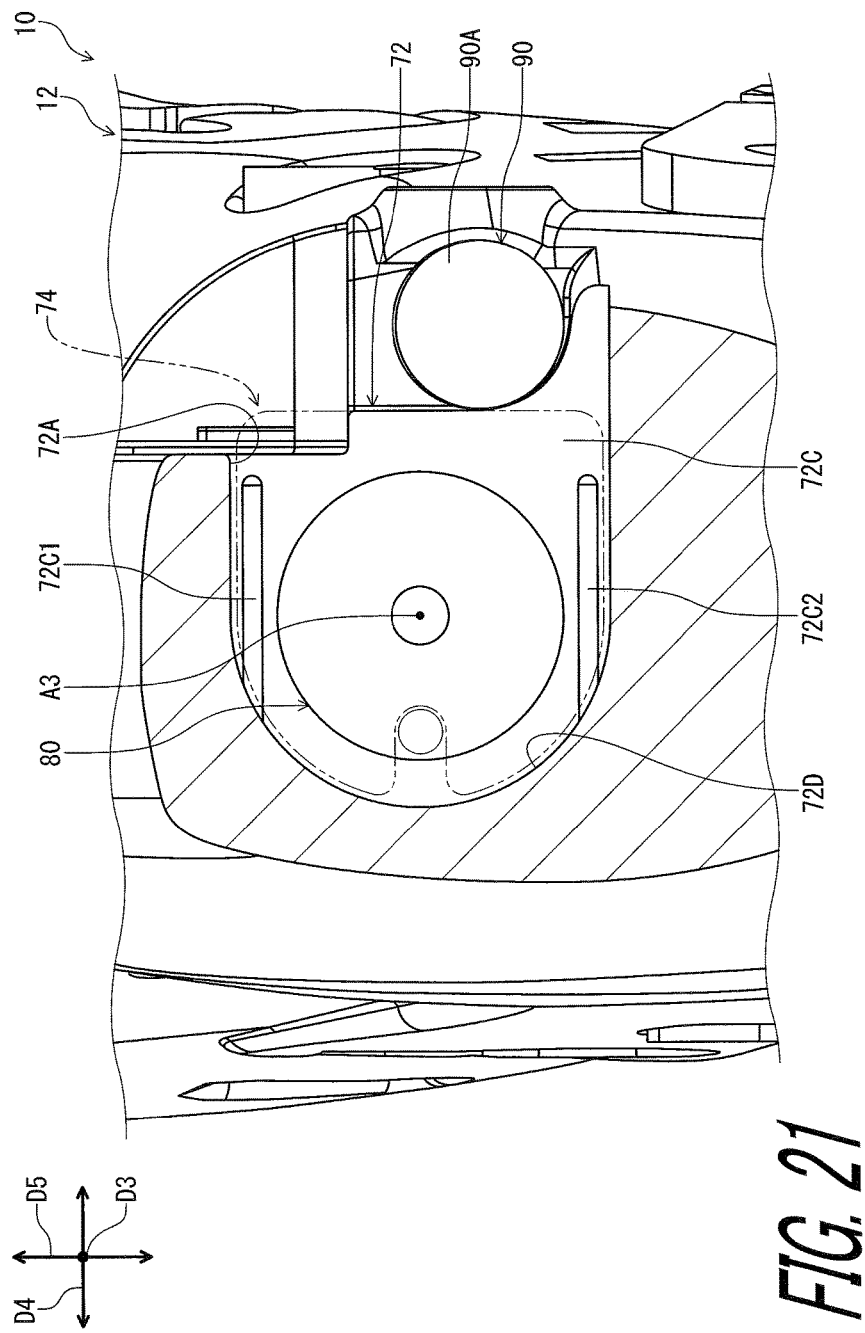
FIG. 21 is a cross-sectional view of the bicycle hydraulic device taken along line XXI-XXI of FIG. 19, with the grip cover and the cover member omitted.

As seen in FIG. 21, the second surface 72C extends about the center axis A3. The second surface 72C extends about the hydraulic bore 34 when viewed from the axial direction D3 parallel to the center axis A3. The second surface 72C has a substantially annular shape and surrounds the hydraulic bore 34 when viewed from the axial direction D3 parallel to the center axis A3. However, the shape of the second surface 72C is not limited to this embodiment.

As seen in FIG. 19, the second surface 72C has a protrusion extending toward the first surface 72B. In this embodiment, the second surface 72C has protrusions 72C1 and 72C2 extending toward the first surface 72B. However, at least one of the protrusions 72C1 and 72C2 can be omitted from the second surface 72C. The cover member 74 is contactable with at least one of the protrusions 72C1 and 72C2.

Figure 22:
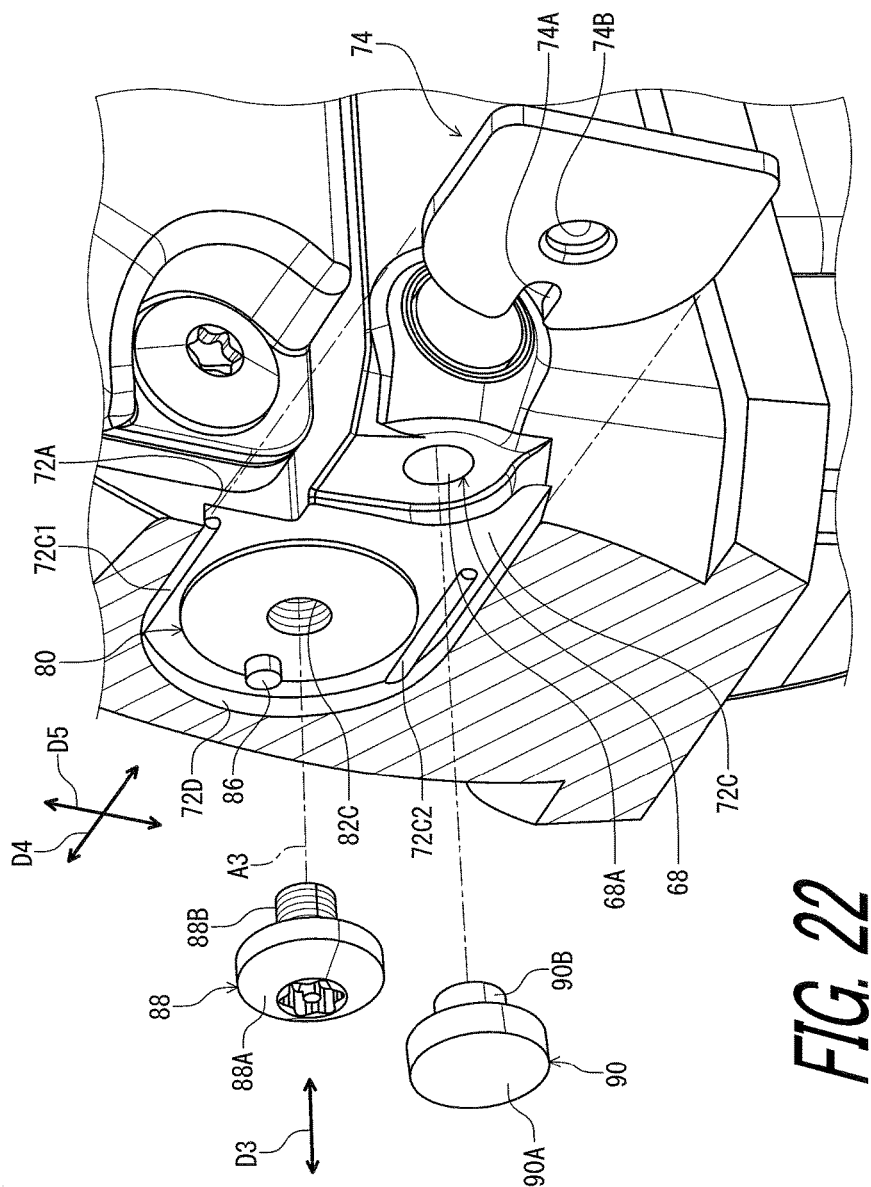
FIG. 22 is a partial cross-sectional and exploded perspective view of the bicycle hydraulic device illustrated in FIG. 1, with the grip cover omitted.

As seen in FIGS. 21 and 22, the protrusions 72C1 and 72C2 linearly extend toward the insertion opening 72A. The protrusions 72C1 and 72C2 extend in an insertion direction D4 perpendicular to the center axis A3. The protrusion 72C1 is spaced apart from the protrusion 72C2 in a perpendicular direction D5 perpendicular to the center axis A3 and the insertion direction D4. The protrusion 72C1 is provided on an opposite side of the protrusion 72C2 with respect to the center axis A3. In this embodiment, the insertion direction D4 is parallel to the transverse direction D6. However, the insertion direction D4 can be defined as a direction different from the axial direction D3.

Figure 23:
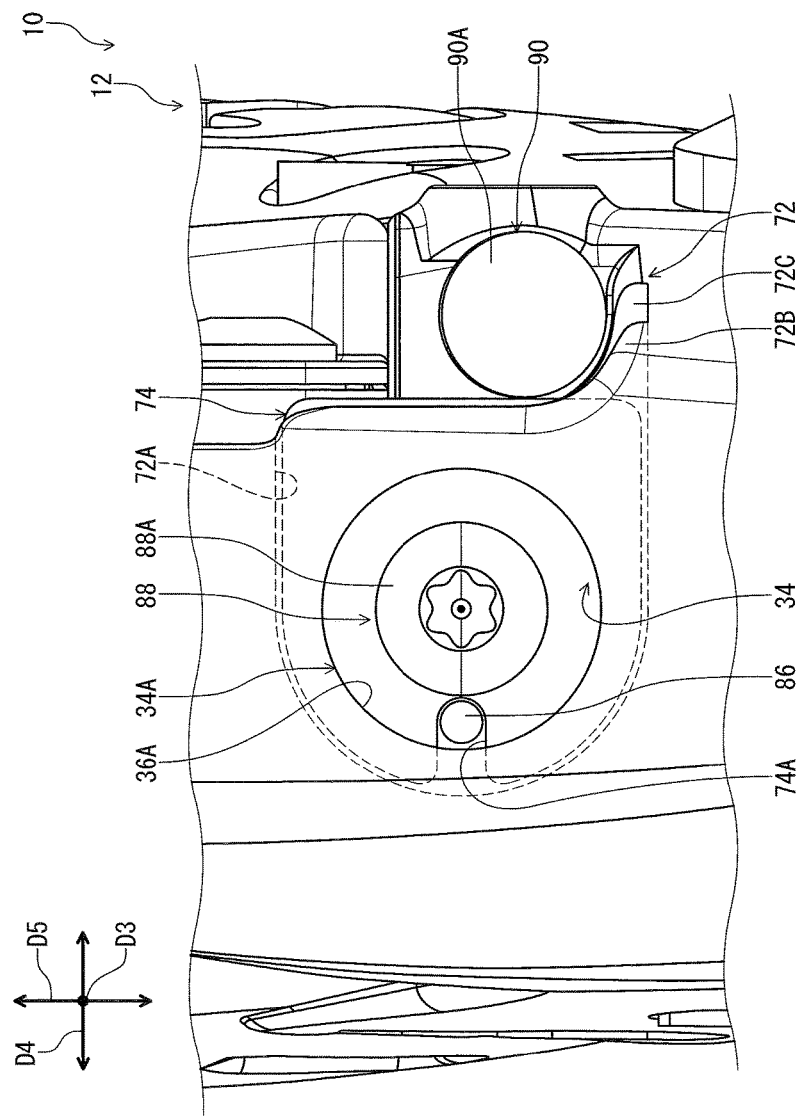
FIG. 23 is a partial plan view of the bicycle hydraulic device illustrated in FIG. 1 taken along in an axial direction, with the grip cover omitted.

As seen in FIG. 23, the second surface 72C faces the first surface 72B without being offset from the first surface 72B when viewed from the axial direction D3 parallel to the center axis A3. The second surface 72C has a shape which is substantially identical to a shape of the first surface 72B when viewed from the axial direction D3. In this embodiment, the first surface 72B has a first area, and the second surface 72C has a second area larger than the first area. However, the shape of the second surface 72C can be completely identical to the shape of the first surface 72B when viewed from the axial direction D3. Furthermore, the shape of the second surface 72C can be completely different from the shape of the first surface 72B when viewed from the axial direction D3.

As seen in FIG. 19, the insertion portion 72 includes a third surface 72D connecting the second surface 72C to the first surface 72B. The first surface 72B, the second surface 72C, and the third surface 72D define an insertion groove 78 having the insertion opening 72A (FIG. 17). In this embodiment, the third surface 72D is parallel to the center axis A3. However, the third surface 72D can be non-parallel to the center axis A3.

As seen in FIG. 17, the cover member 74 is insertable in and removable from the insertion groove 78 via the insertion opening 72A in the insertion direction D4. The insertion groove 78 extends from the insertion opening 72A in the insertion direction D4. The insertion groove 78 is a substantially C-shaped. However, the shape of the insertion groove 78 is not limited to this embodiment.

Figure 24:
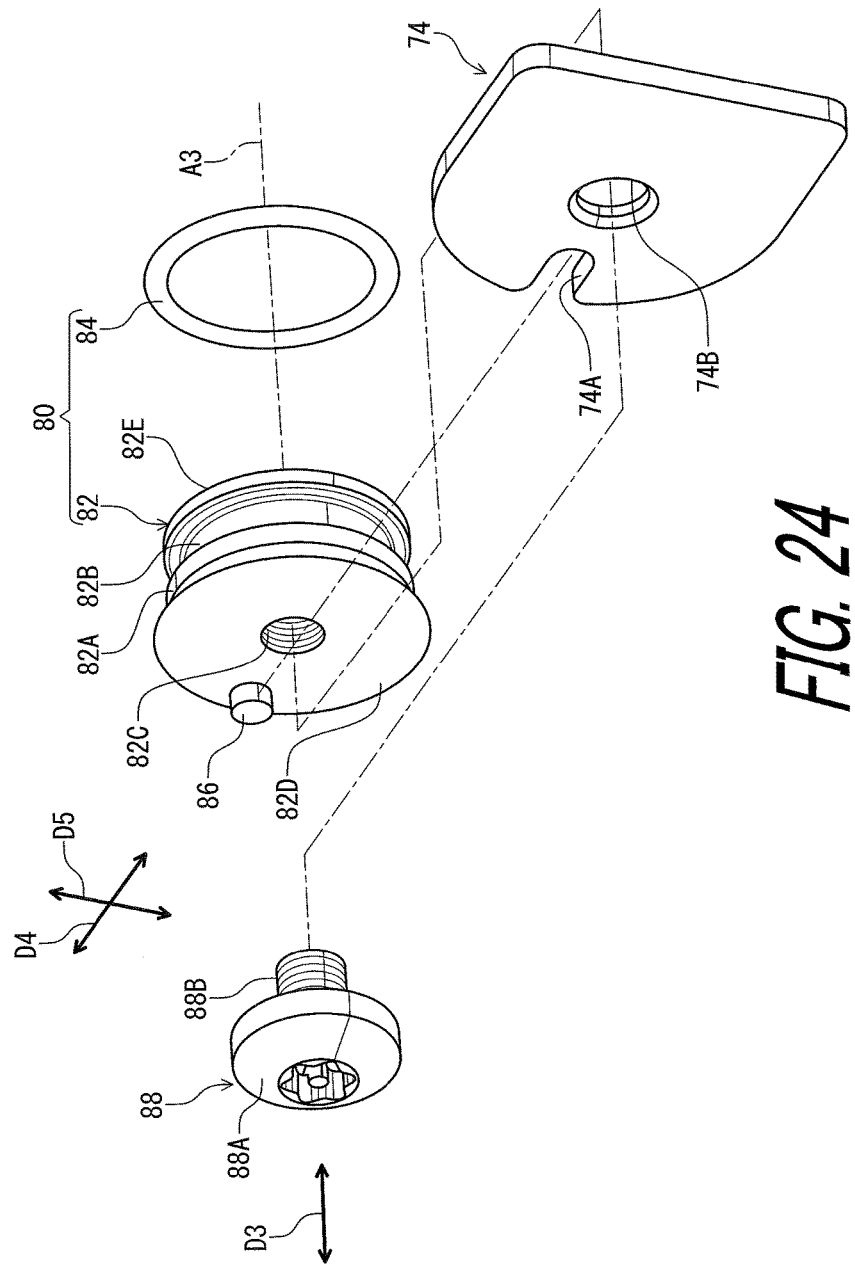
FIG. 24 is an exploded perspective view of the cover member, a seal member, and a coupling member of the bicycle hydraulic device illustrated in FIG. 1.

As seen in FIG. 6, the bicycle hydraulic device 10 further comprises a seal member 80 provided in the hydraulic bore 34 between the cover member 74 and the second end 34B. As seen in FIG. 24, the seal member 80 is attachably and detachably coupled to the cover member 74. The seal member 80 includes a main body 82 and a seal 84. The main body 82 is coupled to the cover member 74. As seen in FIG. 19, the seal 84 is provided on the main body 82 so as to be in contact with an inner peripheral surface 34C of the hydraulic bore 34. The main body 82 includes an outer peripheral surface 82A and an annular groove 82B provided on the outer peripheral surface 82A. The seal 84 is provided in the annular groove 82B. In this embodiment, the main body 82 is made of a non-metallic material such as a resin material. The seal 84 is a separate member from the main body 82 and is made of an elastic material such as rubber. However, the seal 84 can be integrally provided with the main body 82 as a one-piece unitary member.

As seen in FIGS. 23 and 24, the seal member 80 includes a restricting part 86 engaged with the cover member 74 to restrict a relative movement between the main body 82 and the cover member 74. The cover member 74 includes an engagement opening 74A. The restricting part 86 provided in the engagement opening 74A. In this embodiment, the engagement opening 74A extends in the insertion direction D4 in a state where the cover member 74 is disposed at the insertion portion 72.

As seen in FIGS. 19 and 24, the bicycle hydraulic device 10 further comprises a coupling member 88. The coupling member 88 couples the seal member 80 to the cover member 74. Specifically, the coupling member 88 couples the main body 82 to the cover member 74. In this embodiment, the coupling member 88 includes a fastener such as a screw. The coupling member 88 includes a head part 88A and an externally threaded part 88B. The externally threaded part 88B extends from the head part 88A and has an outer diameter smaller than an outer diameter of the head part 88A. The main body 82 includes a threaded hole 82C. The externally threaded part 88B is threadedly engaged with the threaded hole 82C. The cover member 74 includes an intermediate through-hole 74B. The coupling member 88 extends through the intermediate through-hole 74B in a state where the seal member 80 is coupled to the cover member 74. An inner diameter of the intermediate through-hole 74B is smaller than the outer diameter of the head part 88A and larger than the outer diameter of the externally threaded part 88B. The cover member 74 is held between the head part 88A and the seal member 80.

As seen in FIG. 19, the main body 82 includes a first axial end 82D and a second axial end 82E. The main body 82 extends between the first axial end 82D and the second axial end 82E. The first axial end 82D is closer to the first end 34A of the hydraulic bore 34 than the second axial end 82E in a state where the seal member 80 is provided in the hydraulic bore 34. The cover member 74 is coupled to the first axial end 82D with the coupling member 88.

The first axial end 82D has a first outer diameter L11. The second axial end 82E has a second outer diameter L12. In this embodiment, the first outer diameter L11 is larger than the second outer diameter L12. The first outer diameter L11 is a maximum outer diameter of the main body 82. However, the first outer diameter L11 can be equal to or smaller than the second outer diameter L12.

As seen in FIG. 6, the first opening 36A has a first inner diameter L21. The second opening 36B has a second inner diameter L22. In this embodiment, the first inner diameter L21 is larger than the second inner diameter L22. However, the first inner diameter L21 can be equal to or smaller than the second inner diameter L22.

As seen in FIG. 19, the first outer diameter L11 is equal to the first inner diameter L21 and larger than the second inner diameter L22. The seal member 80 is inserted into the hydraulic bore 34 from the first opening 36A before the cover member 74 is inserted in the insertion groove 78.

The outer peripheral surface 82A of the main body 82 includes an outer cylindrical surface 82A1 and an outer inclined surface 82A2. The outer cylindrical surface 82A1 extends from the second axial end 82E toward the first axial end 82D in the axial direction D3. The annular groove 82B is provided on the outer cylindrical surface 82A1. The outer inclined surface 82A2 is inclined relative to the center axis A3 to gradually increase an outer diameter of the main body 82 from the outer cylindrical surface 82A1 to the first axial end 82D.

The inner peripheral surface 34C of the hydraulic bore 34 includes an inner cylindrical surface 34C1 and an inner inclined surface 34C2. The inner cylindrical surface 34C1 extends from the second end 34B toward the first end 34A in the axial direction D3. The inner inclined surface 34C2 is contactable with the outer inclined surface 82A2 of the main body 82. The inner inclined surface 34C2 is inclined relative to the center axis A3 to gradually increase an inner diameter of the hydraulic bore 34 from the inner cylindrical surface 34C1 toward the first end 34A. Specifically, the inner inclined surface 34C2 is inclined relative to the center axis A3 to gradually increase the inner diameter of the hydraulic bore 34 from the inner cylindrical surface 34C1 toward the second surface 72C of the insertion portion 72.

As seen in FIG. 18, the bicycle hydraulic device 10 further comprises a stopper 90 attached to the base member 12 to restrict a relative movement between the cover member 74 and the base member 12. In this embodiment, the stopper 90 is attached to the base member 12 to restrict a movement of the cover member 74 relative to the base member 12 in the insertion direction D4. Specifically, the stopper 90 is attached to the base member 12 to prevent the cover member 74 from being unintentionally removed from the insertion portion 72.

As seen in FIG. 17, an end 68A of the fluid passageway 68 is closed by the stopper 90. The stopper 90 includes a stopper body 90A and a rod body 90B. The rod body 90B extends from the stopper body 90A and is provided in the end 68A of the fluid passageway 68. The stopper body 90A has an outer diameter larger than an outer diameter of the rod body 90B. The stopper 90 is contactable with the cover member 74. The cover member 74 is removable from the hydraulic bore 34 via the insertion opening 72A of the insertion portion 72 until the stopper 90 is attached to the base member 12.

For example, the stopper 90 is made of a resin material and is non-detachably joined to the base member 12 by melting their edges and pressing them together when they are heated. Thus, the stopper 90 is not detachable from the base member 12 without damage in a usage state of the bicycle hydraulic device 10. For example, the stopper 90 is non-detachably joined to the base member 12 by using laser welding. However, the stopper 90 can be joined to the base member 12 by using another process.

As seen in FIGS. 7 and 8, the bicycle hydraulic device 10 further comprises a shifting unit 92 to operate a shifting device BC2. The shifting unit 92 includes a cable control member 94 pivotally provided on the base member 12 about a cable control axis A7. An inner wire of the mechanical control cable C2 is coupled to the cable control member 94. The cable control member 94 pivots relative to the base member 12 about the cable control axis A7 in response to the movement of the operating member 16 and the additional operating member 26. Structures of the shifting unit 92 have been known in the bicycle field, they will not be described in detail here for the sake of brevity. The shifting unit 92 can be omitted from the bicycle hydraulic device 10. Furthermore, the shifting unit 92 can include an electrical switch (an upshifting switch and/or a downshifting switch) instead of the above mechanical structure. In such an embodiment, the electrical switch is mounted to the operating member 16, the base member 12, or another member. The electrical switch can be connected with a bicycle component (e.g., a bicycle derailleur) via a wired connection, a wireless connection, or a combination thereof.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hydraulic device comprising:
   a base member configured to be mounted to a bicycle body, the base member comprising:
      a hydraulic bore having
         a first end defining a first opening provided on an outer surface of the base member, and
         a second end defining a second opening configured to receive a piston and a piston rod; and
      an insertion portion provided between the first end and the second end, the insertion portion including an insertion opening provided on the outer surface of the base member at a location different from the first opening and the second opening; and
   a cover member provided at the insertion portion via the insertion opening to cover the hydraulic bore.

2. The bicycle hydraulic device according to claim 1, wherein
   the insertion portion is provided closer to the first end than to the second end.

3. The bicycle hydraulic device according to claim 1, wherein
   the insertion opening is different from the second opening.

4. The bicycle hydraulic device according to claim 3, wherein
   the piston is movably provided in the hydraulic bore to be removable from the second opening.

5. The bicycle hydraulic device according to claim 1, wherein
   the insertion portion includes a first surface extending along a plane facing the second end, and
   the cover member is contactable with the first surface.

6. The bicycle hydraulic device according to claim 5, wherein
   the hydraulic bore defines a center axis, and
   the plane including the first surface is perpendicular to the center axis.

7. The bicycle hydraulic device according to claim 5, wherein
   the insertion portion includes a second surface spaced apart from the first surface to face the first surface.

8. The bicycle hydraulic device according to claim 7, wherein
   the hydraulic bore extends in an axial direction along a center axis, and
   the second surface faces the first surface without being offset from the first surface when viewed from the axial direction.

9. The bicycle hydraulic device according to claim 7, wherein
   the second surface has a protrusion extending toward the first surface.

10. The bicycle hydraulic device according to claim 7, wherein the cover member is at least partly provided between the first surface and the second surface.

11. The bicycle hydraulic device according to claim 7, wherein the hydraulic bore defines a center axis, the first surface extends about the center axis, and the second surface extends about the center axis.

12. The bicycle hydraulic device according to claim 7, wherein the insertion portion includes a third surface connecting the second surface to the first surface, and the first surface, the second surface, and the third surface define an insertion groove having the insertion opening.

13. The bicycle hydraulic device according to claim 1, further comprising a seal member provided in the hydraulic bore between the cover member and the second end.

14. The bicycle hydraulic device according to claim 13, wherein the seal member includes a main body coupled to the cover member, and a seal provided on the main body so as to be in contact with an inner peripheral surface of the hydraulic bore.

15. The bicycle hydraulic device according to claim 14, wherein the seal member includes a restricting part engaged with the cover member to restrict a relative movement between the main body and the cover member.

16. The bicycle hydraulic device according to claim 15, wherein the cover member includes an engagement opening, and the restricting part is provided in the engagement opening.

17. The bicycle hydraulic device according to claim 14, further comprising a coupling member coupling the main body to the cover member.

18. The bicycle hydraulic device according to claim 1, further comprising a stopper attached to the base member to restrict a relative movement between the cover member and the base member.

19. The bicycle hydraulic device according to claim 18, wherein the base member includes a fluid passageway connected to the hydraulic bore, and an end of the fluid passageway is closed by the stopper.

20. A bicycle hydraulic device comprising:

a base member configured to be mounted to a bicycle body, the base member including a hydraulic bore having a first end defining a first opening provided on an outer surface of the base member, and a second end defining a second opening;

a piston movably provided in the hydraulic bore to be removable from the second opening;

a cover member provided on the base member to define a hydraulic chamber between the cover member and the piston in the hydraulic bore, the cover member being received within an insertion opening provided on the outer surface of the base member at a location different from the first opening and the second opening; and a seal member provided in the hydraulic bore between the cover member and the piston, the seal member being attachably and detachably coupled to the cover member.

* * * * *